(12) United States Patent
Boudreaux et al.

(10) Patent No.: US 9,559,473 B2
(45) Date of Patent: Jan. 31, 2017

(54) MULTI-BATTERY AND MULTI-DEVICE CONNECTION SYSTEM

(71) Applicant: Connect-Ease L. L. C., Eden Prairie, MN (US)

(72) Inventors: Burt A Boudreaux, Eden Prairie, MN (US); Calvin D Munkvold, Eden Prairie, MN (US)

(73) Assignee: Connect-Ease L. L. C., Eden Prairie, MN (US)

( * ) Notice: Subject to any disclaimer, the term of this patent is extended or adjusted under 35 U.S.C. 154(b) by 116 days.

(21) Appl. No.: 14/671,425

(22) Filed: Mar. 27, 2015

(65) Prior Publication Data

US 2015/0295340 A1 Oct. 15, 2015

Related U.S. Application Data

(60) Provisional application No. 61/979,701, filed on Apr. 15, 2014.

(51) Int. Cl.
| | | |
|---|---|---|
| *H01R 11/00* | (2006.01) | |
| *H01R 25/00* | (2006.01) | |
| *H01R 11/28* | (2006.01) | |
| *H01R 31/02* | (2006.01) | |
| *H01M 2/20* | (2006.01) | |

(52) U.S. Cl.
CPC ........... *H01R 25/003* (2013.01); *H01M 2/206* (2013.01); *H01R 11/288* (2013.01); *H01R 31/02* (2013.01)

(58) Field of Classification Search
None
See application file for complete search history.

(56) References Cited

U.S. PATENT DOCUMENTS

| | | | |
|---|---|---|---|
| 4,081,738 A | 3/1978 | Roller | |
| 4,082,401 A | 4/1978 | Kruszecki | |
| 4,272,142 A | 6/1981 | Zapf | |
| D281,314 S | 11/1985 | Bates | |
| 4,649,332 A | 3/1987 | Bell | |
| 4,726,786 A | 2/1988 | Hill | |
| 4,906,205 A | 3/1990 | Viles | |
| 4,999,562 A | 3/1991 | Hill | |

(Continued)

FOREIGN PATENT DOCUMENTS

| | | |
|---|---|---|
| CA | 1098962 A1 | 4/1981 |
| EP | 1970244 A2 | 9/2008 |

(Continued)

OTHER PUBLICATIONS

Trollingmotors.net; Trolling Motor Quick Connect; 2014; http://www.trollingmotors.net/trolling-motor-quick-connect.

(Continued)

*Primary Examiner* — Xuong Chung Trans
(74) *Attorney, Agent, or Firm* — Adams Grumbles, LLP; Brittany Nanzig

(57) ABSTRACT

An electrical connection system that connects and disconnects a plurality of supply circuits. More specifically, a connection system that can quickly connect two or more batteries in series by connecting a wire bridge system to two or more mated battery side connectors. Alternatively, the connection system can quickly connect a plurality of devices to one battery connection point by connecting a multi-device connector to a mated battery side connector.

16 Claims, 24 Drawing Sheets

(56) References Cited

U.S. PATENT DOCUMENTS

| | | | |
|---|---|---|---|
| 5,086,208 | A | 2/1992 | Habermann |
| 5,225,761 | A | 7/1993 | Albright |
| 5,233,282 | A | 8/1993 | Iwashita |
| 5,795,182 | A | 8/1998 | Jacob |
| 5,859,517 | A | 1/1999 | DePasqua |
| 5,896,022 | A | 4/1999 | Jacobs, Sr. |
| 5,986,431 | A | 11/1999 | Hayes |
| 6,049,141 | A | 4/2000 | Sieminski |
| 6,123,576 | A | 9/2000 | James |
| 6,152,784 | A | 11/2000 | Pyles |
| 6,160,373 | A | 12/2000 | Dunn |
| 6,281,600 | B1 | 8/2001 | Hough |
| 6,319,055 | B1 * | 11/2001 | Conner, Jr. .......... H01R 11/288 439/504 |
| 6,430,692 | B1 | 8/2002 | Kimble |
| 7,008,259 | B2 | 3/2006 | Agnew |
| 7,033,209 | B2 * | 4/2006 | Swiatek .......... B62J 99/00 439/502 |
| 7,193,393 | B1 | 3/2007 | Payne |
| 7,675,261 | B2 | 3/2010 | Elder |
| 8,026,446 | B2 | 9/2011 | Oriet |
| 2002/0155752 | A1 | 10/2002 | Winkle et al. |
| 2005/0040788 | A1 | 2/2005 | Tseng |
| 2006/0178028 | A1 | 8/2006 | Swiatek |
| 2009/0091292 | A1 | 4/2009 | Nippear |
| 2012/0091944 | A1 | 4/2012 | Rogers |
| 2012/0295456 | A1 | 11/2012 | Severac |

FOREIGN PATENT DOCUMENTS

| | | |
|---|---|---|
| WO | 2006020537 A2 | 2/2006 |
| WO | 2013138380 A2 | 9/2013 |

OTHER PUBLICATIONS

Wes Wiedmaier; Marine Battery Wiring 101; 1996; http://www.cabelas.com/product/Marine-Battery-Wiring/531785.uts.

Trollingmotors.net; Trolling Motor Plug Overview; 2014; http://www.trollingmotors.net/trolling-motor-plug.

Thermodyne-Systems; Info on parallel and series wiring for 12 and 24 volt batteries; 2011; http://www.hydrogenappliances.com/wiring.html.

DragonByte Technologies Ltd; Terrova 80 problems; May 16, 2012; http://www.crappie.com/crappie/fishing-electronics-and-photography/215753-terrova-80-problems/.

Pontoon Trolling Motor; Wiring 36 Volt Trolling Motor; 2014; http://www.pontoontrollingmotor.com/category/12-volt-trolling-motor/wiring-36-volt-trolling-motor/.

Yandina Ltd; How to Charge Your Trolling Battery from Your Outboard Engine; 2008; http://www.yandina.com/TrollBattery.htm.

Powerwerx; Fuse Holders, ATC Fuses, Circuit Breakers; 2011; http://www.powerwerx.com/fuses-circuit-protection/.

Powerwerx; OEM-T inline Powerpole splitter; 2012; http://www.powerwerx.com/adapter-cables/oem-t-inline-powerpole-splitter.html.

Powerwerx; Power Pole DC Power Distribution; 2011; http://www.powerwerx.com/powerpole-power-distribution/.

* cited by examiner

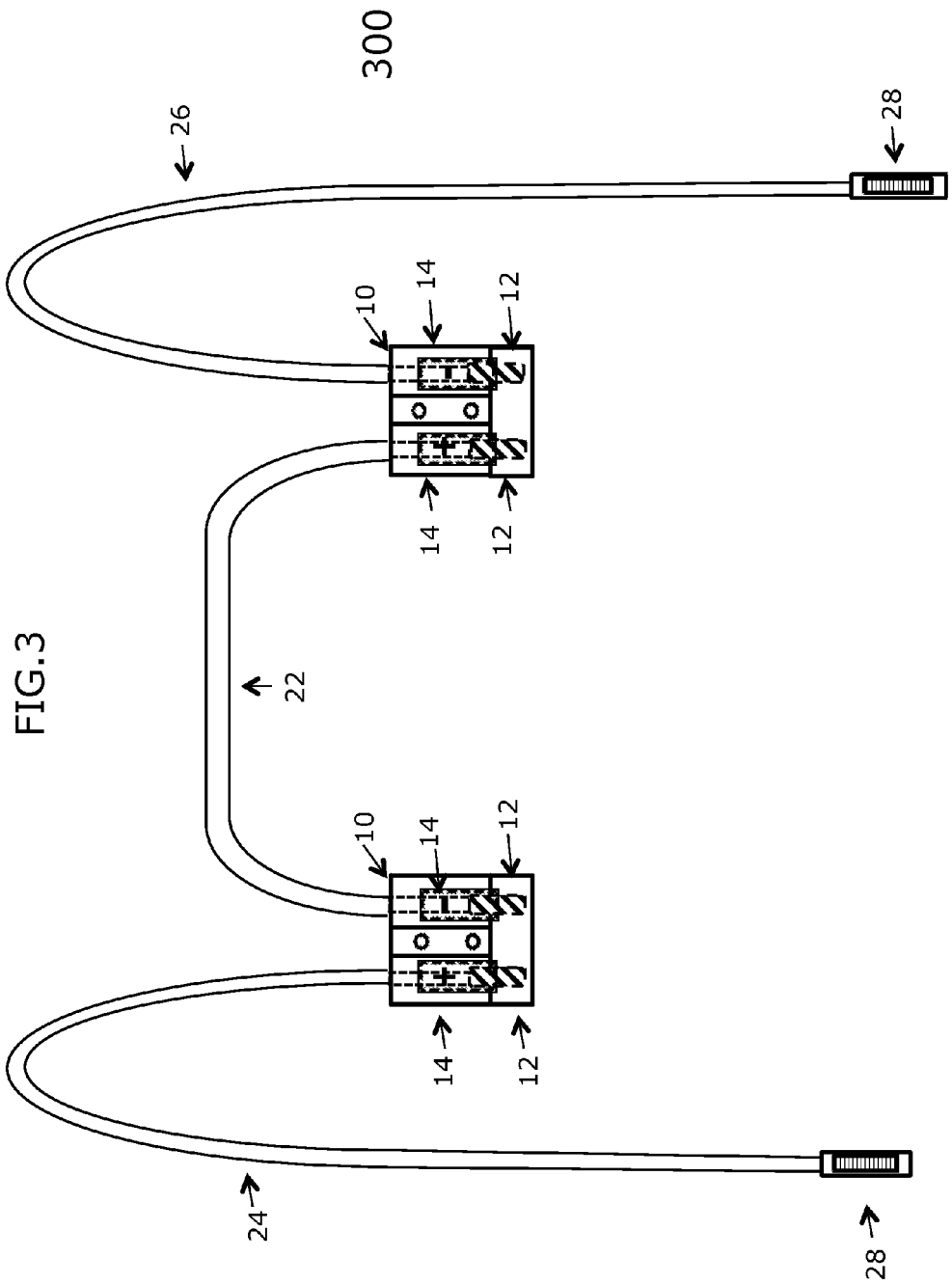

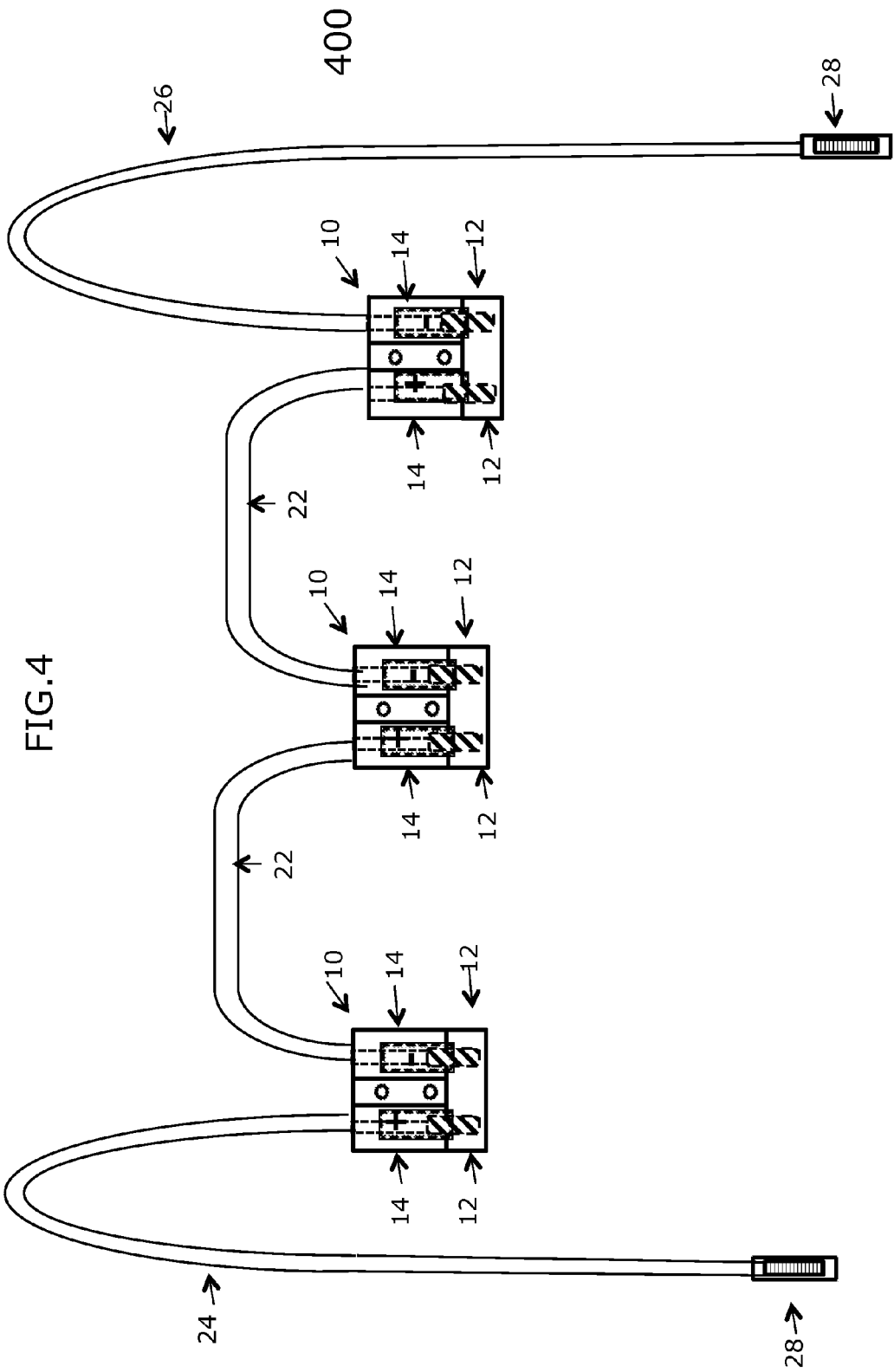

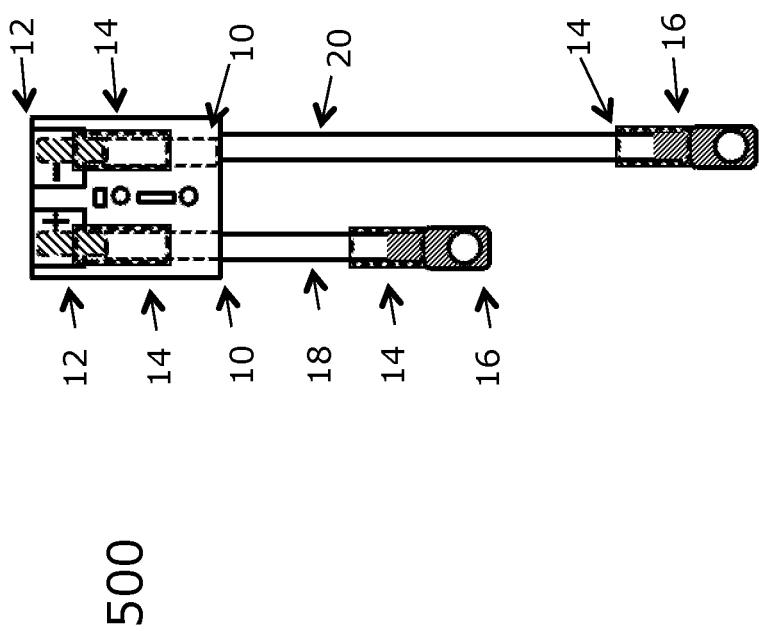

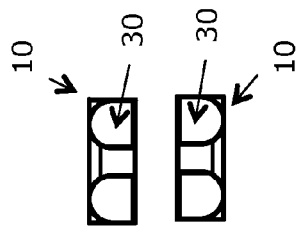
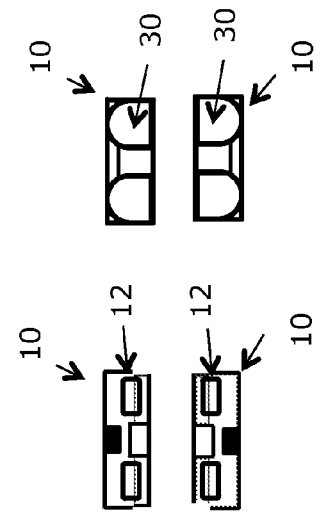
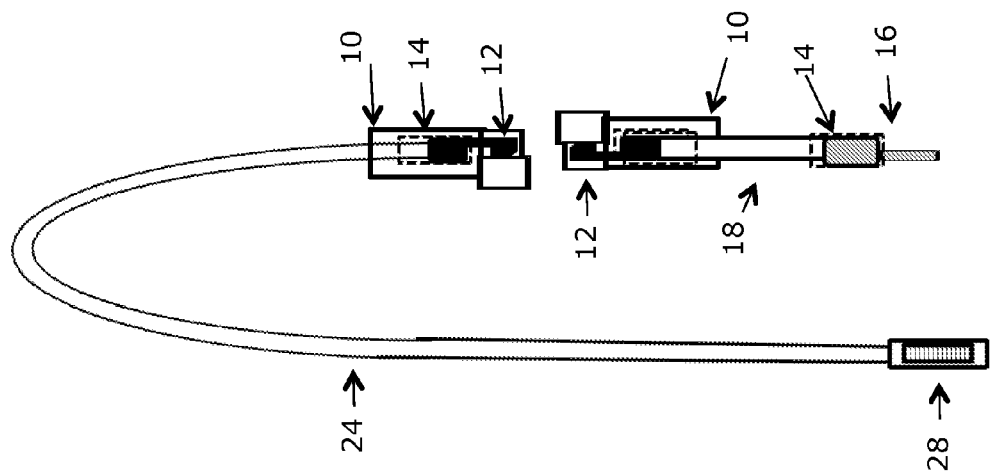

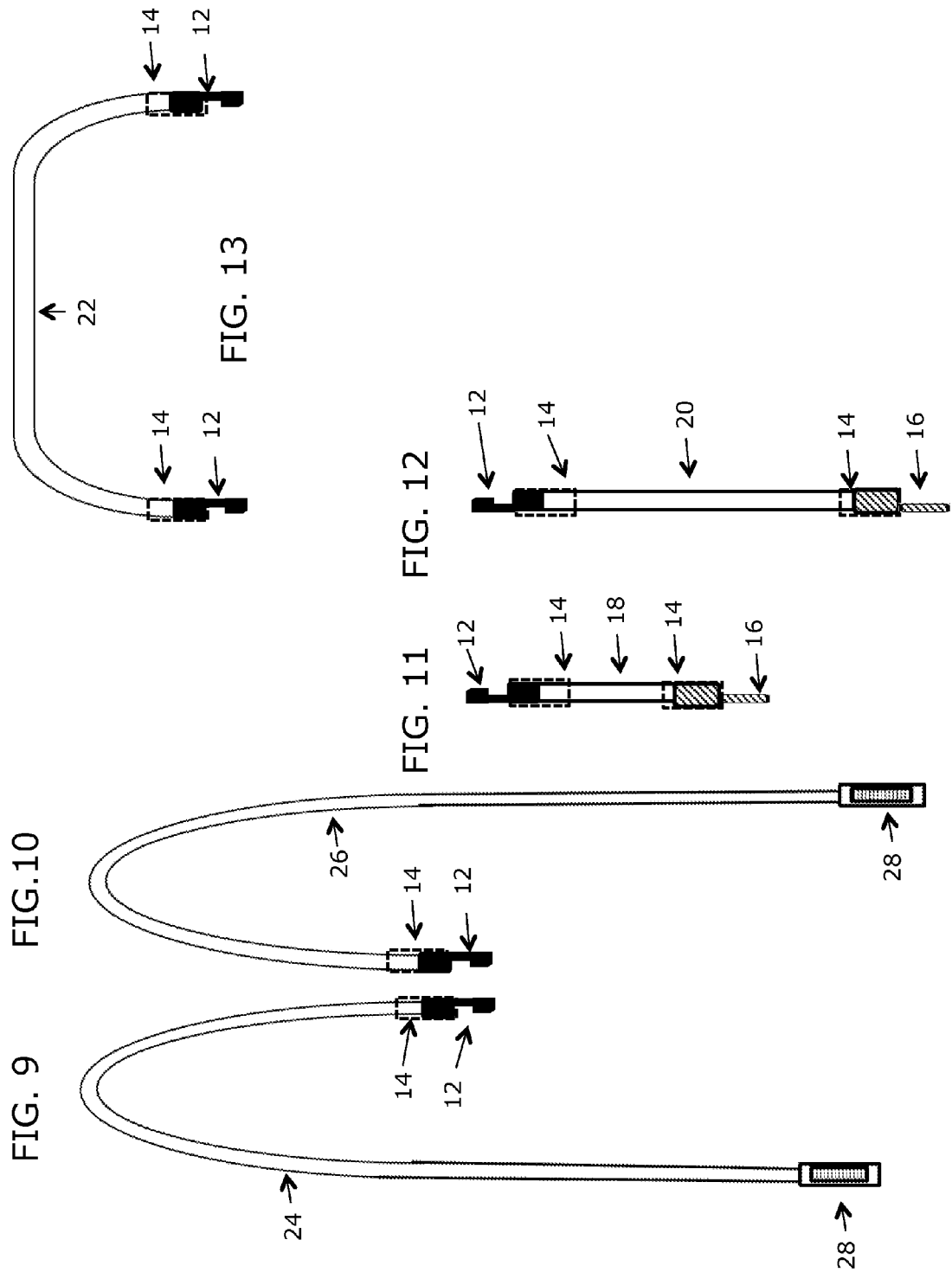

3102

MULTI-BATTERY AND MULTI-DEVICE CONNECTION SYSTEM

FIELD

The present invention generally relates to the field of electrical connectors. More specifically, the present invention relates to the field of supply circuit connection and disconnection.

BACKGROUND

Many people use devices that require a battery for energy, such as marine motors, recreational vehicles, all-terrain vehicles, automobiles, and other industrial devices. For example, people who fish often use a trolling motor that requires a 12-volt battery to run. However, when extensive, continuous use of a motor, such as a trolling motor, is required, a single battery may run out of energy while the person still needs to use the motor. Fortunately, connecting two or more batteries can lengthen the battery life. However, connecting two batteries together is currently a confusing process and can lead to damage to the battery or other equipment. Additionally, it can lead to physical injury to the person attempting to connect the batteries. A system and method is needed that permits a user to efficiently, and safely, connect and disconnect extra batteries when extended battery life or increased voltage is required and that provides a user with the option to utilize a standard parallel voltage connection.

Additionally, there are a variety of situations in which people simultaneously run a plurality of devices that require a battery for power. For example, people who fish often use a trolling motor, depth finder, radio, running lights, and GPS, all of which require a 12-volt battery. Unfortunately, in order to connect a plurality of devices to a battery, each device must connect via its own independent wire lead, terminals, and independent fuse block. Additionally, even when turned off, connected devices may continue to drain the battery they are connected to. A system and method is needed where a user can efficiently, and safely, connect and disconnect a plurality of devices to a battery, and wherein no drain occurs to the battery when devices are connected, but not in use.

BRIEF SUMMARY OF THE INVENTION

The present invention is a connection system that can connect two batteries using a wire bridge system that is mated into a pair of connectors on each battery. The mated battery connectors can ensure a one-way connection and eliminate an incorrect connection, thus creating a quick and easy setup that is safe to use. For example, the present invention can be used to convert two 12-volt batteries into a 24-volt system. Additional bridging wire can also be utilized to convert three or more 12-volt batteries into a larger voltage system. For example, three 12-volt batteries can be connected in series to create a 36-volt system. Further, the connectors can also include wire leads that are attached to the wire bridge system to create a 12-volt parallel connection.

The present invention can also, for example, convert one 12-volt connection into a multi-device 12-volt system. This system includes two connection blocks that connect to each other, wherein a first connection block is mated to two sets of independent wire leads, each set combined into one connection point, and a second connection block is mated to two independent wires that both connect to a 12-volt battery. The connection blocks ensure a one-way connection and eliminate an incorrect connection, thus creating a quick and easy setup. The independent wire leads can be non-fused or can be fused together at the connection point on the connection block and can be of varying size and length. Therefore, one 12-volt battery connection can be connected to a plurality of devices from one connection point at the battery.

BRIEF DESCRIPTION OF THE DRAWINGS

FIG. 3 illustrates a top down view of an exemplary wire bridge system according to one embodiment of the present invention.

FIG. 4 illustrates a top down view of an exemplary wire bridge system according to one embodiment of the present invention.

FIG. 5 illustrates a top down view of mated battery side connectors according to one embodiment of the present invention.

FIG. 6 illustrates a side view of a part of a wire bridge system and a mated battery side connector according to one embodiment of the present invention.

FIG. 7 illustrates a front view of top and bottom terminal connectors on a connection block according to one embodiment of the present invention.

FIG. 8 illustrates a front view of top and bottom terminal connector slots on a connection block according to one embodiment of the present invention.

FIG. 9 illustrates a side view of a wire lead according to one embodiment of the present invention.

FIG. 10 illustrates a side view of a wire lead according to one embodiment of the present invention.

FIG. 11 illustrates a side view of a mated battery side connector wire and terminal connector wire according to one embodiment of the present invention.

FIG. 12 illustrates a side view of a mated battery side connector wire and terminal connector wire according to one embodiment of the present invention.

FIG. 13 illustrates a side view of a bridging wire with terminal connectors according to one embodiment of the present invention.

DETAILED DESCRIPTION

Figure 1:
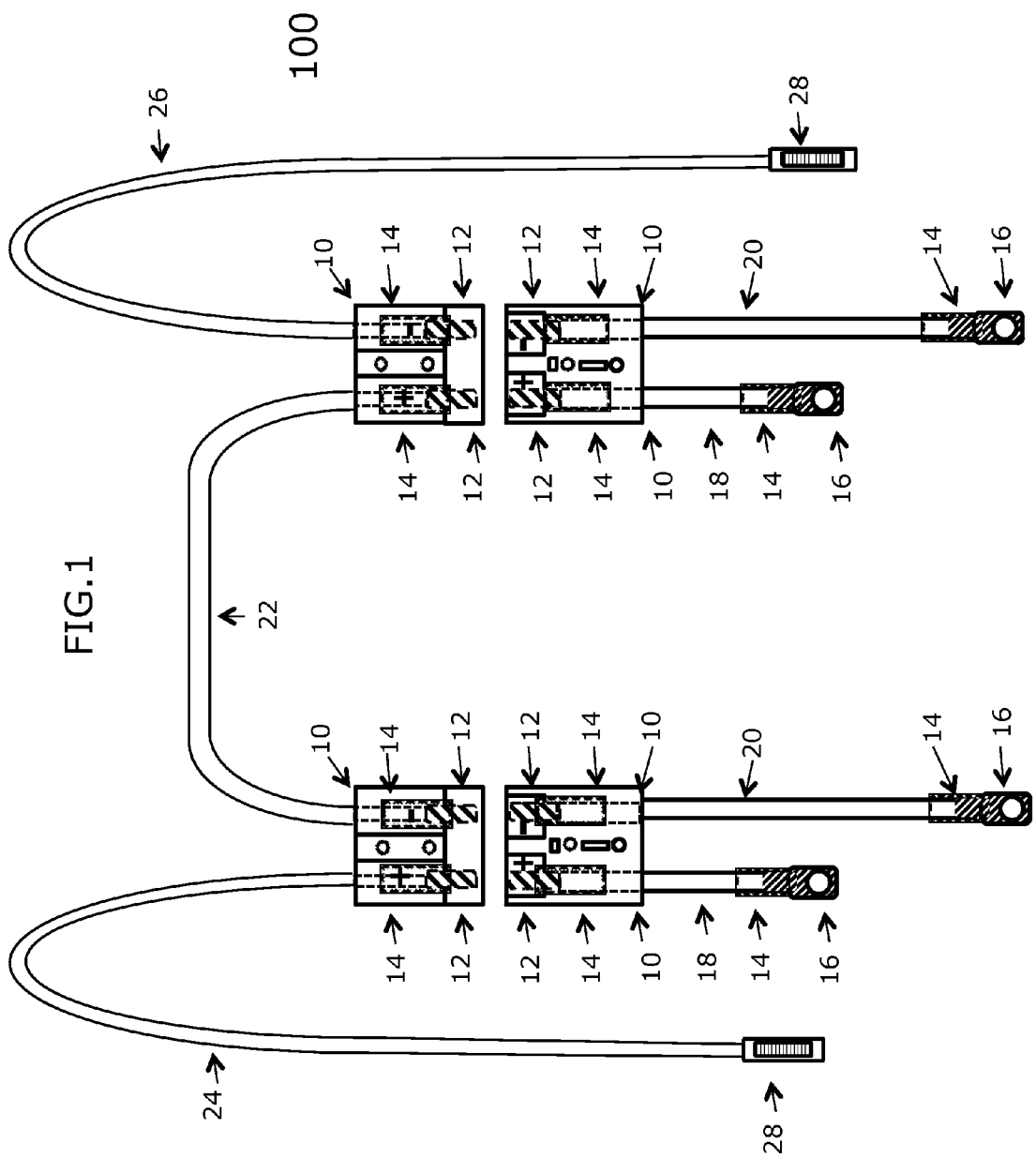
FIG. 1 illustrates a top down view of the disclosed multi-battery connection system according to one embodiment of the present invention.

Various embodiments will be described in detail with references to drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover application or embodiments without departing from the spirit or scope of the claims attached hereto. Also, it is to be understood that the phraseology and terminology used herein are for the purpose of description and should not be regarded as limiting.

Multi-Battery Connection System

Figure 2:
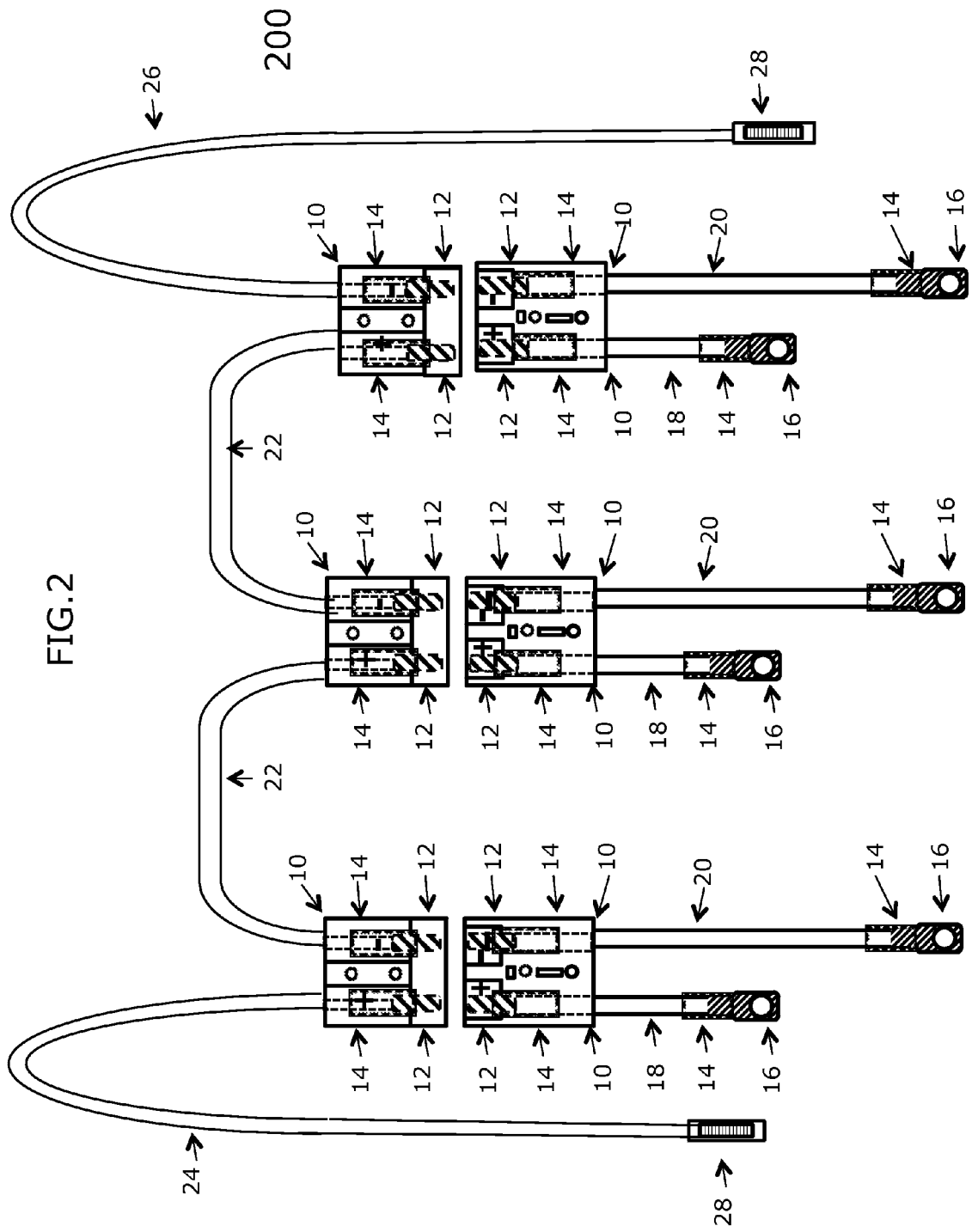
FIG. 2 illustrates a top down view of the disclosed multi-battery connection system according to one embodiment of the present invention.

In general, the complete multi-battery connection system can connect two or more batteries in series to increase the available voltage. In one embodiment, as illustrated in FIGS. 1 and 2, the disclosed multi-battery connection system 100, 200 generally includes a wire bridge system 300, 400, as illustrated in FIGS. 3 and 4, and at least two mated battery side connectors 500, as illustrated in FIG. 5. More specifically, in one embodiment, the wire bridge system 300, 400 includes at least two connection blocks 10, a bridging wire 22 with a terminal connector 12 covered with shrink wire wrap 14 on each end of the bridging wire 22, the bridging wire 22 connecting the first connection block 10 and the second connection block 10 via the two terminal connectors 12, a red wire lead 24 attached on one end to a connector 28, such as a butt splice, and on the other end, via a terminal connector 12 covered with shrink wire wrap 14, to the first connection block 10, and a black wire lead 26 attached on one end to a connector 28, such as a butt splice, and on the other end, via a terminal connector 12 covered with shrink wire wrap 14, to the second connection block 10. In some embodiments, the terminal connectors 12 are not covered with shrink wire wrap 14.

In one embodiment, one mated battery side connector 500 includes a connection block 10, a red wire 18 attached on one end to a terminal lug connector 16 covered with shrink wire wrap 14 and on the other end, via a terminal connector 12 covered with shrink wire wrap 14, to the connection block 10, and a black wire 20 attached on one end to a terminal lug connector 16 covered with shrink wire wrap 14 and on the other end, via a terminal connector 12 covered with shrink wire wrap 14, to the connection block 10. In some embodiments, the terminal lug connectors 16 and/or the terminal connectors 12 are not covered with shrink wire wrap 14.

FIGS. 6 through 8 illustrate how the system enables a user to efficiently, and safely, connect and disconnect multiple batteries 32. FIG. 6 illustrates a side view of a connection block 10 for a wire bridge system 300, 400 and a side view of a connection block 10 for a mated battery side connector 500, and shows how the two connection blocks 10 connect to each other. More specifically, the terminal connectors 12 are designed to stack on top of each other when the connection block 10 for the wire bridge system 300, 400 connects to the connection block 10 for the mated battery side connector 500. FIG. 7 illustrates a front view of the top and bottom terminal connectors 12 on a connection block 10, wherein the top terminal connector 12 is part of the wire bridge system 300, 400 and the bottom terminal connector is part of the mated battery side connector 500. FIG. 8 illustrates a front view of the top and bottom terminal connector slots 30 on a connection block 10, wherein the top terminal connector slot 30 is located below the terminal connector 12 in the wire bridge system 300, 400 and the bottom terminal connector slot 30 is located above the terminal connector 12 in the mated battery side connector 500.

In one embodiment of the wire bridge system 300, 400, the red wire lead 24 and the black wire lead 26 are of equal length. In another embodiment, the red wire lead 24 and the black wire lead 26 are different lengths. As described above, the red wire lead 24 and the black wire lead 26 can each be connected to separate connection blocks 10. Each wire lead can connect on one end to a connection block 10 via a terminal connector 12, wherein the terminal connector 12 is attached to the end of the wire lead. In some embodiments, the terminal connector 12 is attached to the end of the wire lead using shrink wire wrap 14. The ends of the red wire lead 24 and the black wire lead 26 that are not connected to a connection block 10 can be connected, via a connector 28, to a load, such as a motor's cable. Further, the red wire lead 24 can connect to the positive terminal of the first connection block 10 and the black wire lead 26 can connect to the negative terminal of the last connection block 10, as illustrated in FIGS. 3 and 4.

In one embodiment, as illustrated in FIG. 3, the middle portion of the wire bridge system 300 includes two connection blocks 10, a bridging wire 22, such as a black bridging wire, and two terminal connectors 12 that are crimped to the ends of the bridging wire 22 and covered, or, in some embodiments, not covered, with shrink wire wrap 14. When the terminal connectors 12 are crimped to the ends of the bridging wire 22, as illustrated in FIG. 13, the bridging wire 22 becomes sealed to the terminal connectors 12. The sealed combination of the bridging wire 22 and terminal connector 12 can then be inserted and locked into a terminal connector slot 30 on the negative terminal of the first connection block 10 and a terminal connector slot 30 on the positive terminal of the second connection block 10. In a two-battery system, there is one bridging wire 22 connecting two connection blocks 10. In a three-battery system, there are two bridging wires 22 connecting three connection blocks 10, as illustrated in FIG. 4, wherein the first bridging wire 22 connects on its first end to the negative terminal of the first connection block 10 and on its second end to the positive terminal of the second connection block 10, and the second bridging wire 22 connects on its first end to the negative terminal of the second connection block 10 and on its second end to the positive terminal of the third connection block 10.

In one embodiment of the wire bridge system 300, the red wire lead 24 is crimped on one end and secured to the terminal connector 12 using shrink wire wrap 14 and, on the other end, is crimped and secured to a connector 28, such as a butt splice, using, for example, shrink wire wrap 14, as illustrated in FIG. 9. The combination of the red wire lead 24 and terminal connector 12 can then be pushed into the terminal connector slot 30 on the positive terminal of the first connection block 10. The black wire lead 26, similar to the red wire lead 24, is crimped on one end and secured to the terminal connector 12 using, for example, shrink wire wrap 14 and, on the other end, is crimped and secured to a connector 28, such as a butt splice, using, for example, shrink wire wrap 14, as illustrated in FIG. 10. The combination of the black wire lead 26 and terminal connector 12 is then pushed into the terminal connector slot 30 on the negative terminal of the second connection block 10. As illustrated in FIG. 4, the wire bridge system 400 can, in one embodiment, connect more than two batteries 32 using two or more bridging wires 22, but will only have one red wire lead 24 and one black wire lead 26. In some embodiments, shrink wire wrap 14 is not used for one or more of the above-described connections.

Figure 14:
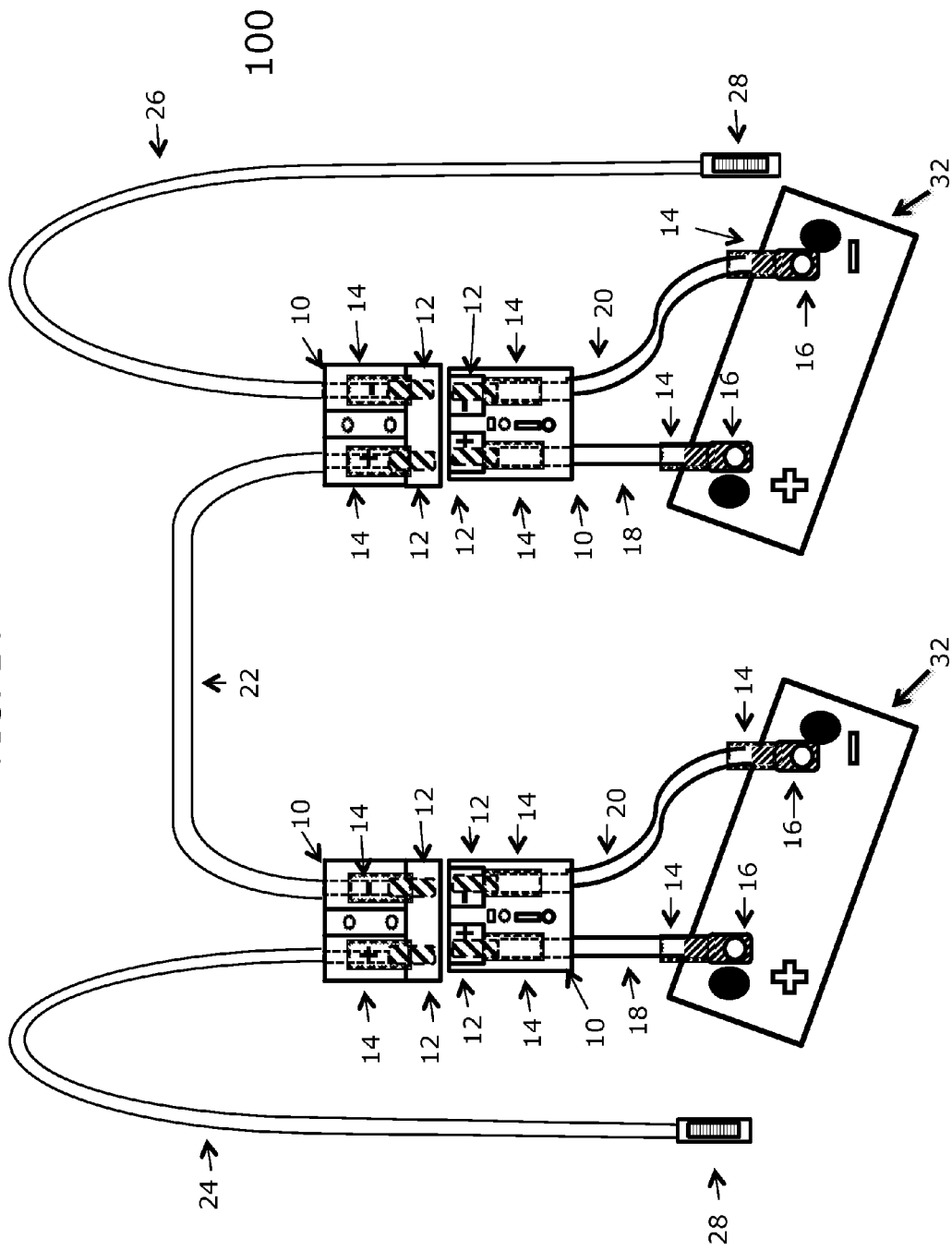
FIG. 14 illustrates a top down view of the disclosed multi-battery connection system connected to two batteries according to one embodiment of the present invention.
Figure 15:
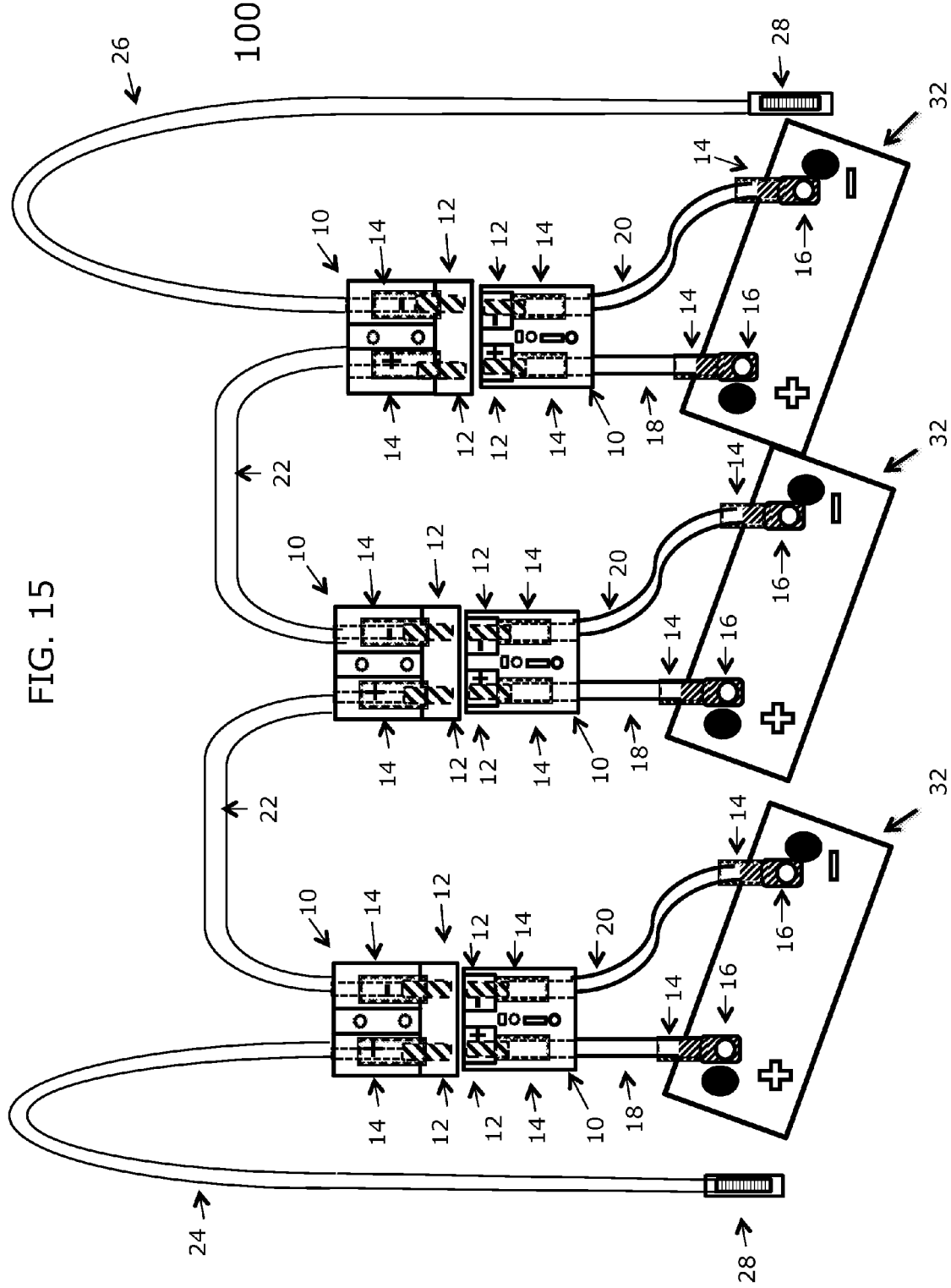
FIG. 15 illustrates a top down view of the disclosed multi-battery connection system connected to three batteries according to one embodiment of the present invention.

In one embodiment of the mated battery side connector 500, the red wire 18 and black wire 20 are of different lengths, with the red wire 18 being shorter than the black wire 20, as illustrated in FIGS. 11 and 12. In one embodiment, the red wire 18 can be 5 inches long and the black wire 20 can be 10 inches long. One end of each of the wires can be connected to a connection block 10 through the use of terminal connectors 12. The other end of the red wire 18 and black wire 20 can be connected to a battery 32, such as a 12-volt battery, through the use of a terminal lug connector 16, as illustrated in FIGS. 14 and 15. The red wire 18 can connect to the positive terminal of the battery 32 and the black wire 20 can connect to the negative terminal of the battery 32.

More specifically, each of the mated battery side connectors 500 includes a connection block 10 with a red wire 18 and a black wire 20 that are crimped on their first ends and secured to terminal connectors 12 using, for example, shrink wire wrap 14. FIG. 8 illustrates a terminal connector slot 30 in a connection block 10. The combination of the red wire 18 and terminal connector 12 can be pushed into the terminal connector slot 30 on the positive terminal of the connection block 10. The combination of the black wire 20 and terminal connector 12 can then be pushed into the terminal connector slot 30 on the positive terminal of the connection block 10. The second ends of the red wire 18 and black wire 20 are crimped and each wire can be secured to a terminal lug connector 16 using, for example, shrink wire wrap 14. In some embodiments, shrink wire wrap 14 is not used for one or more of the above-described connections.

In one embodiment, the multi-battery connection system 100 easily connects two or more batteries 32 in series. More specifically, the mated battery side connector 500 can be left affixed to a battery 32 with its connection block 10 disconnected from another connection block 10. The wire bridge system 300, 400 can also be left intact and affixed to a load, such as, but not limited to, a motor's cables, with its connection block 10 disconnected from another connection block 10. Therefore, when a user desires to create a plurality of supply circuits, the user simply has to connect the two connection blocks 10 to each other. While 24- and 36-volt systems are described herein, it is appreciated that additional bridging wires 22 can be added to a base 24-volt system to create any voltage system in 12-volt increments (ex: 36-volt, 48-volt, 60-volt, 72-volt, etc.). Additionally, smaller or larger voltage batteries can be connected in series using the described system.

Figure 16:
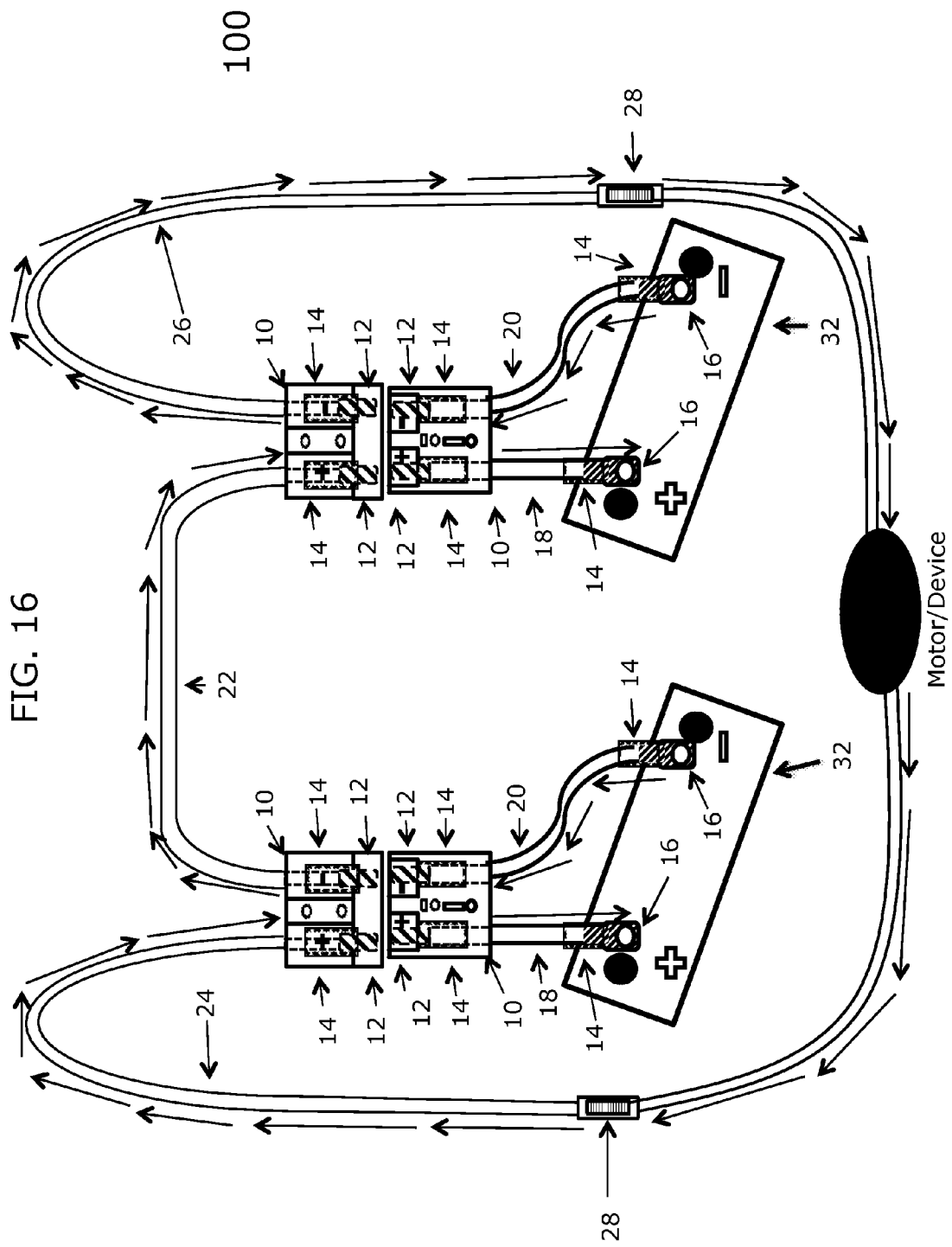
FIG. 16 illustrates the flow of the electrical current through the disclosed multi-battery connection system when two batteries and a motor are connected in series according to one embodiment of the present invention.
Figure 18:
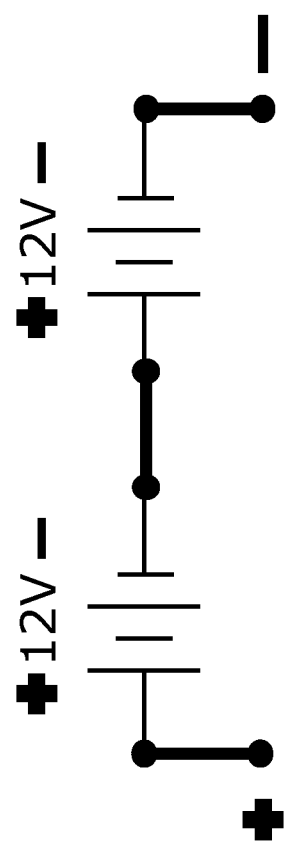
FIG. 18 illustrates the flow of the electrical current through the disclosed multi-battery connection system according to one embodiment of the present invention.

Therefore, the full connection system setup for two batteries 32 includes a first mated battery side connector 500 with a first connection block 10 and connected to a first battery 32 through the use of two terminal lug connectors 16; the second mated battery side connector 500 with a second connection block 10 and connected to the second battery 32 through the use of two terminal lug connectors 16; the red wire lead 24 connected to a load, such as a motor's cable, and a third connection block 10; the black wire lead 26 connected to a load, such as a motor's cable, and a fourth connection block 10; the bridging wire 22 connecting the third and fourth connection blocks 10; and the third and fourth connection blocks 10 of the wire bridging system 300 pairing with, and connected to, the first and second connection blocks 10 of the mated battery side connectors 500. Once these connections are made, the user has a 24-volt battery system. FIGS. 16 and 18 illustrate the flow of the electrical current through a two-battery system. To disconnect the wire bridging system 300 from the batteries 32, a user can unplug the connection blocks 10 from each other.

Figure 17:
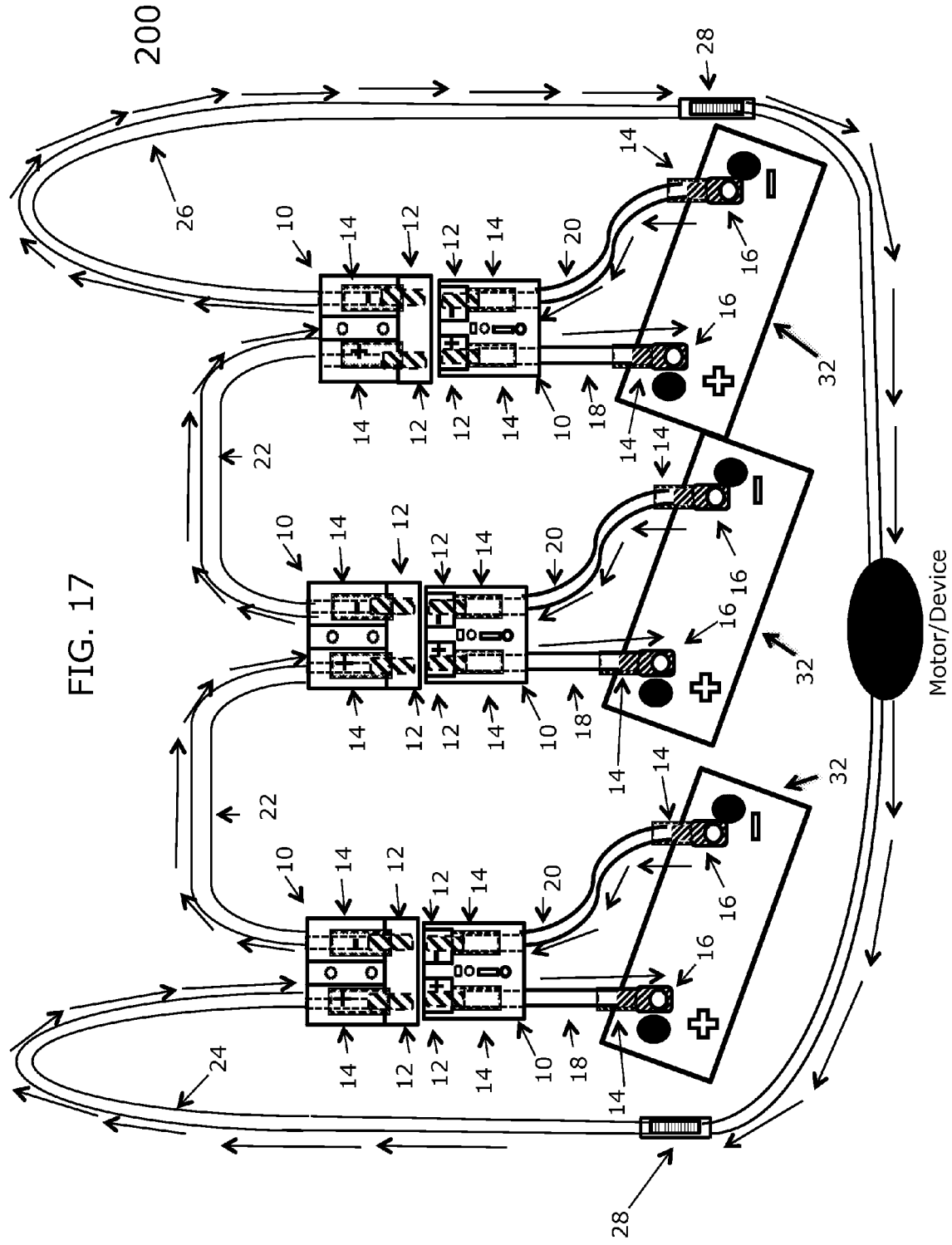
FIG. 17 illustrates the flow of the electrical current through the disclosed multi-battery connection system when three batteries and a motor are connected in series according to one embodiment of the present invention.
Figure 19:
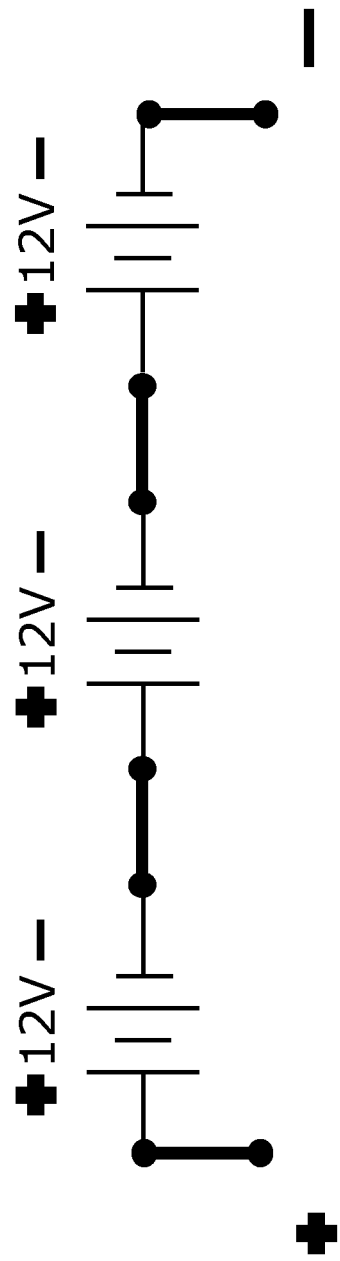
FIG. 19 illustrates the flow of the electrical current through the disclosed multi-battery connection system according to one embodiment of the present invention.
Figure 20:
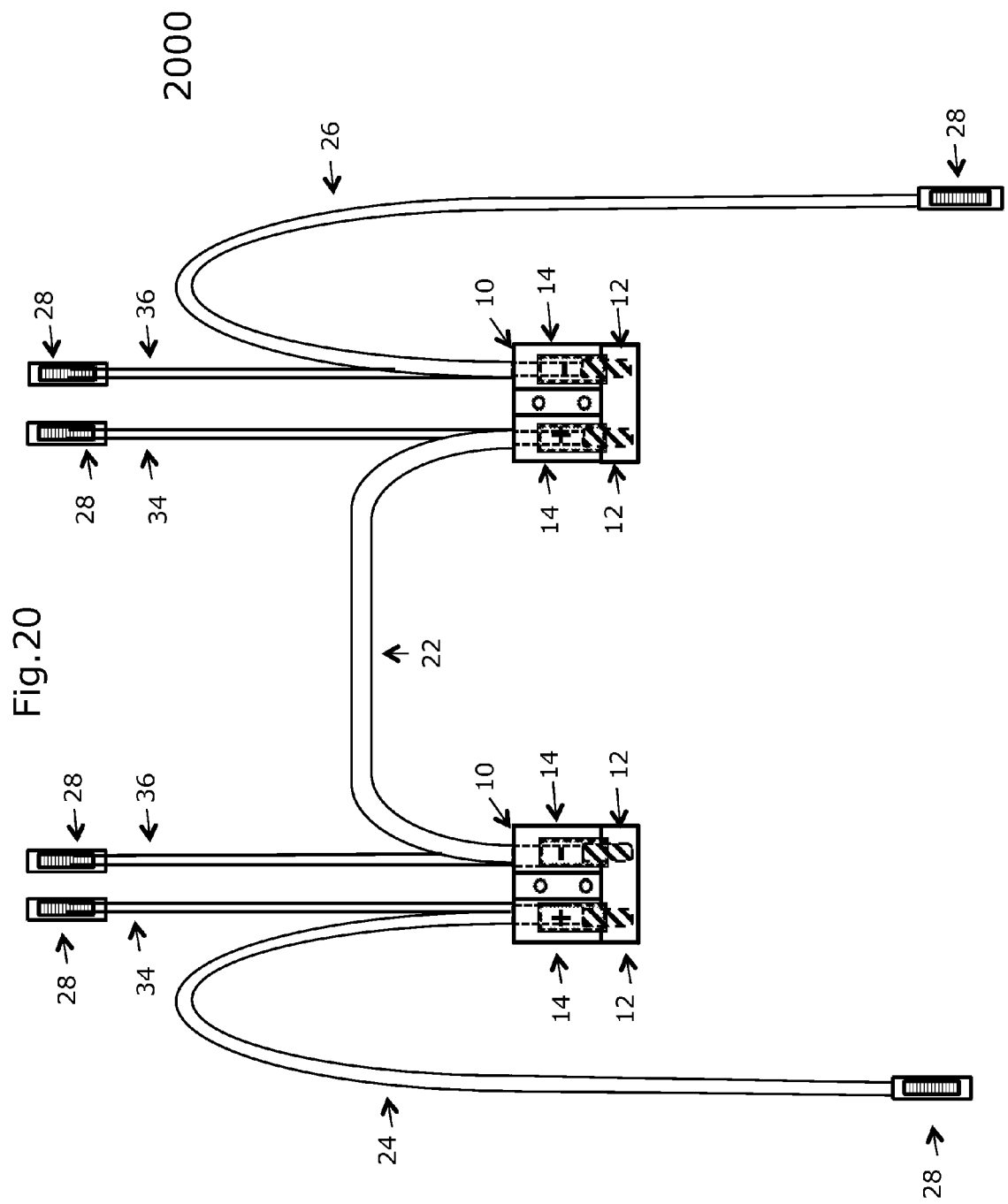
FIG. 20 illustrates a top down view of the disclosed multi-battery connection system with independent parallel battery leads according to one embodiment of the present invention.
Figure 21:
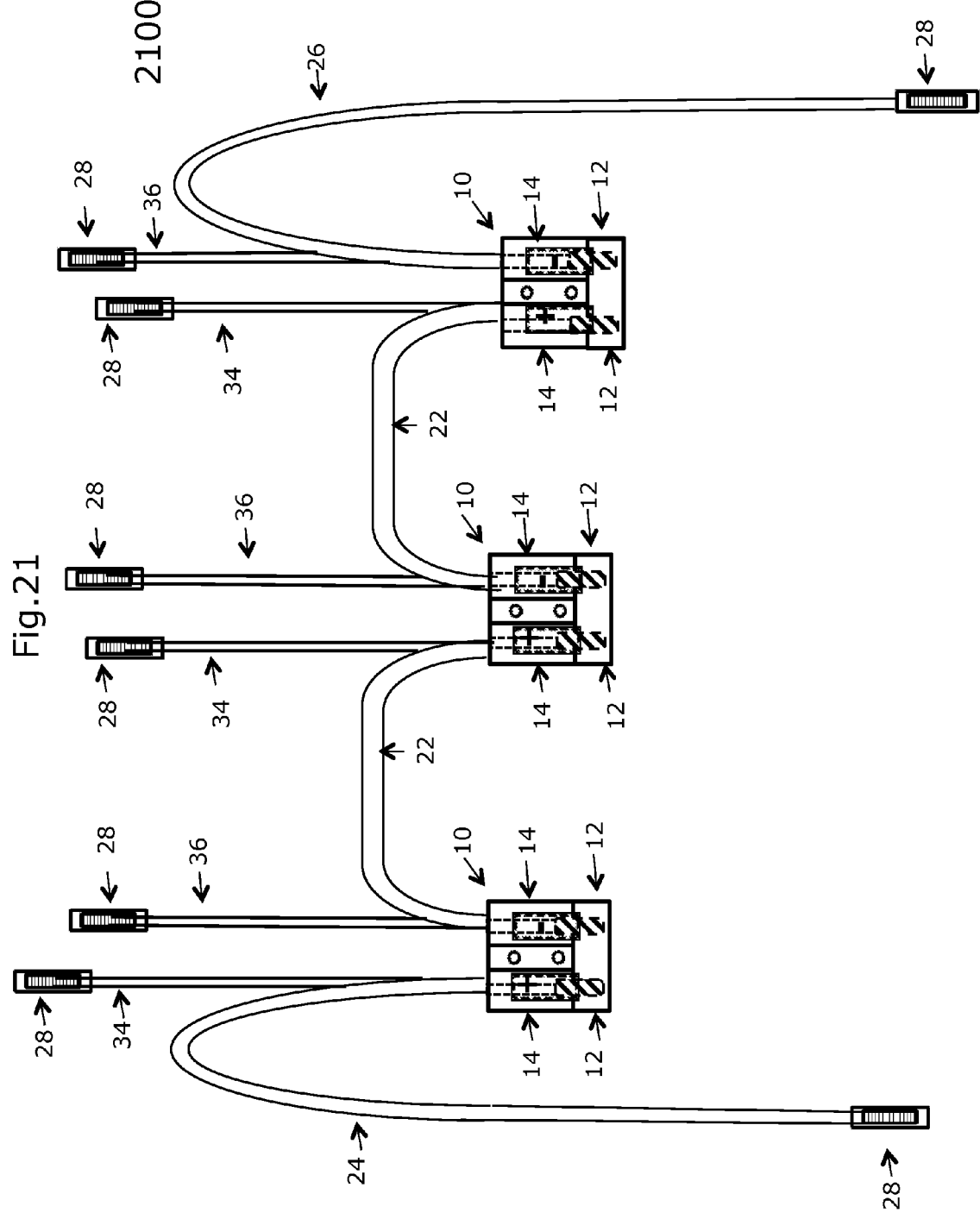
FIG. 21 illustrates a top down view of the disclosed multi-battery connection system with independent parallel battery leads according to one embodiment of the present invention.

The full connection system setup for three batteries 32 includes a first mated battery side connector 500 with a first connection block 10 and connected to a first battery 32 through the use of two terminal lug connectors 16, the second mated battery side connector 500 with a second connection block 10 and connected to the second battery 32 through the use of the terminal lug connectors 16, the third mated battery side connector 500 with a third connection block 10 and connected to the third battery 32 through the use of the terminal lug connectors 16, the red wire lead 24 connected to a load, such as a motor's cable, and a fourth connection block 10, the first bridging wire 22 connecting the fourth connection block 10 and a fifth connection block 10, the black wire lead 26 connected to a load, such as a motor's cable, and a sixth connection block 10, the second bridging wire 22 connecting the fifth connection block 10 and the sixth connection block 10, and the fourth, fifth, and sixth connection blocks 10 of the wire bridging system 400 pairing with and connected to the first, second, and third connection blocks 10 of the mated battery side connectors 500. Once these connections are made, the user has a 36-volt battery system. FIGS. 17 and 19 illustrate the flow of the electrical current through a three-battery system. To disconnect the wire bridging system 400 from the batteries 32, a user can unplug the connection blocks 10 from each other.

Figure 22:
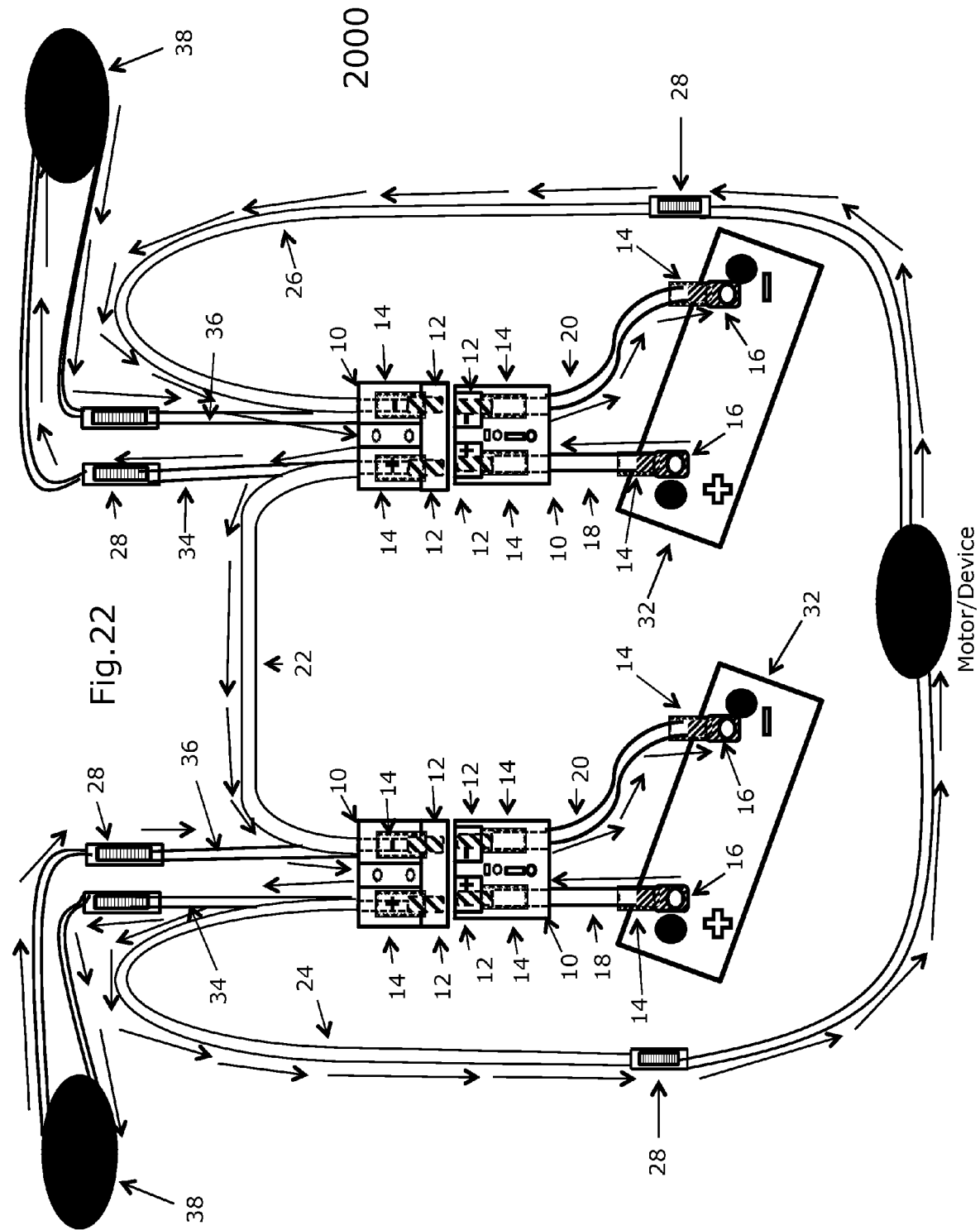
FIG. 22 illustrates the flow of electrical current through the disclosed multi-battery connection system when two batteries and a motor are connected in series and two additional devices are connected to the system in parallel according to one embodiment of the present invention.
Figure 23:
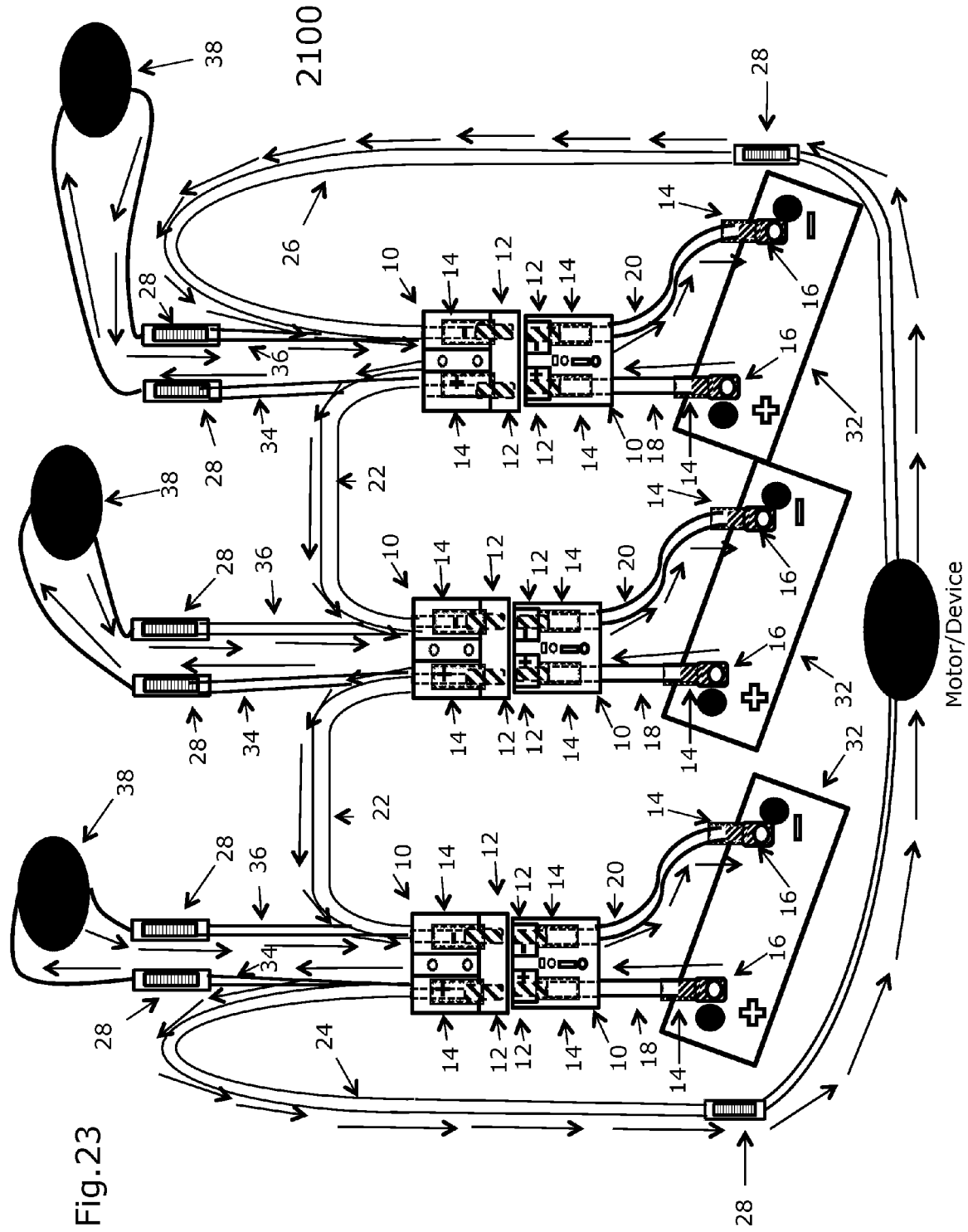
FIG. 23 illustrates the flow of electrical current through the disclosed multi-battery connection system when three batteries and a motor are connected in series and three additional devices are connected to the system in parallel according to one embodiment of the present invention.

In one embodiment, as illustrated in FIGS. 20 through 23, the disclosed multi-battery connection system 100, 200 can include a secondary connection system 2000, 2100 that directly attaches to two or more loads 38. Further, this embodiment can connect to at least two mated battery side connectors 500 that, in turn, each connect to a battery, as illustrated in FIGS. 22 and 23. More specifically, in one embodiment, the secondary connection system 2000, 2100 can include two connection blocks 10, a bridging wire 22 connecting the two connection blocks 10 via a terminal connector 12 with shrink wire wrap 14 on each end of the bridging wire 22, a first red wire lead 24 attached to the first connection block 10 via a terminal connector 12 with shrink wire wrap 14, a first black wire lead 26 attached to the second connection block 10 via a terminal connector 12 with shrink wire wrap 14, a second red wire lead 34 connected to and leading from each of the two connection blocks 10 via a terminal connecter 12 with shrink wire wrap 14, a second black wire lead 26 connected to and leading from each of the two connection blocks 10 via a terminal connector 12 with shrink wire wrap 14, and six connectors 28, one connected to end of each of the six wire leads. In one embodiment, one mated battery side connector 500 includes a connection block 10, a red wire 18 attached on one end to the third connection block 10 via a first terminal connector 12 with shrink wire wrap 14 and on the other end to a terminal lug connector 16, and a black wire 20 attached on one end to the fourth connection block 10 via a second terminal connector 12 with shrink wire wrap 14 and on the other end to a terminal lug connector 16. In some embodiments, shrink wire wrap 14 is not used for one or more of the above-described connections.

In one embodiment, the secondary connection system 2000, 2100 connects two or more batteries 32 in series and offers up to two parallel connections, one off of each battery 32, each connection to a load 38. To connect two batteries 32, as illustrated in FIG. 22, a user can first connect each of the two mated battery side connectors 500 to a battery 32 through the use of terminal lug connectors 16 attached to one end of a red wire 18 and one end of a black wire 20. Once these connections are made, a user can connect the red wire lead 24 and the black wire lead 26 from the secondary system 2000 to a load, such as a motor's cables, using terminal lug connectors 16 that are attached to one end of the red wire lead 24 and one end of the black wire lead 26. Finally, a user can connect the connection blocks 10 from the secondary system 2000 to the connection blocks 10 from the mated battery side connector 500 to create a 24-volt battery system.

To connect three batteries 32, as illustrated in FIG. 23, a user can first connect each of the three mated battery side connectors 500 to a battery 32 through the use of terminal lug connectors 16 that are attached to one end of a red wire 18 and one end of a black wire 20. Once these connections are made, a user can connect the red wire lead 24 and the black wire lead 26 from the secondary system 2100 to a load, such as a motor's cables, using terminal lug connectors 16 attached to one end of the red wire lead 24 and one end of the black wire lead 26. Finally, a user can connect the connection blocks 10 from the secondary system 2100 to the connection blocks 10 from the mated battery side connector 500 to create a 36-volt battery system.

In some embodiments of the secondary connection system 2000, 2100, a user can also connect a load 38, such as a motor, to the secondary connection system 2000, 2100 in parallel. To make this connection, the user can first connect the second red wire lead 34 that is attached to a connection block 10 to a first cable on the load 38. The user can next connect the second black wire lead 36 that is attached to the connection block 10 to a second cable on the load 38. The user then has a parallel connection between the secondary connection system 2000, 2100 and the load 38.

Multi-Device Connection System

Figure 24:
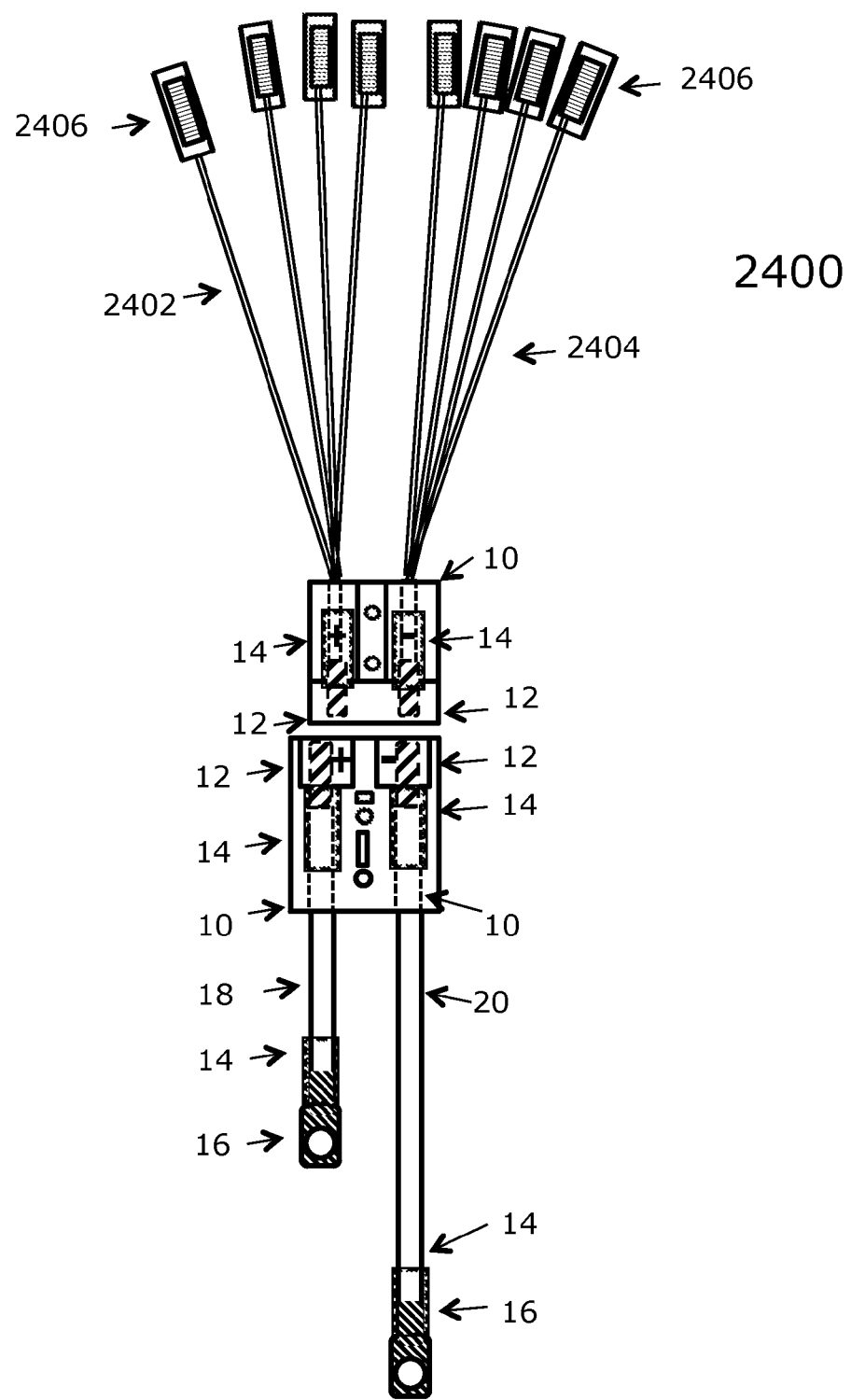
FIG. 24 illustrates a top down view of the disclosed multi-device connection system according to one embodiment of the present invention.
Figure 25:
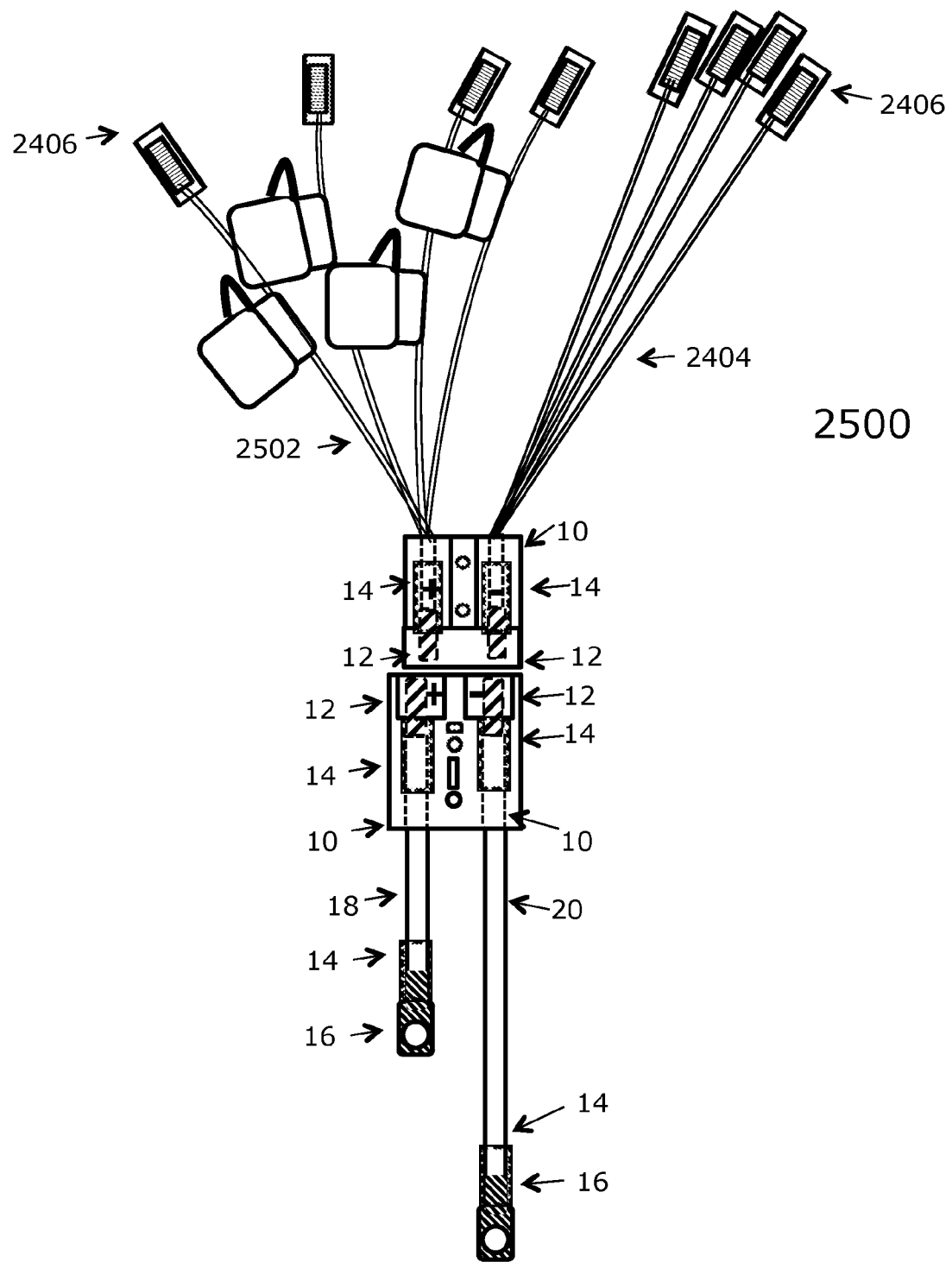
FIG. 25 illustrates a top down view of the disclosed multi-device connection system according to one embodiment of the present invention.
Figure 27:
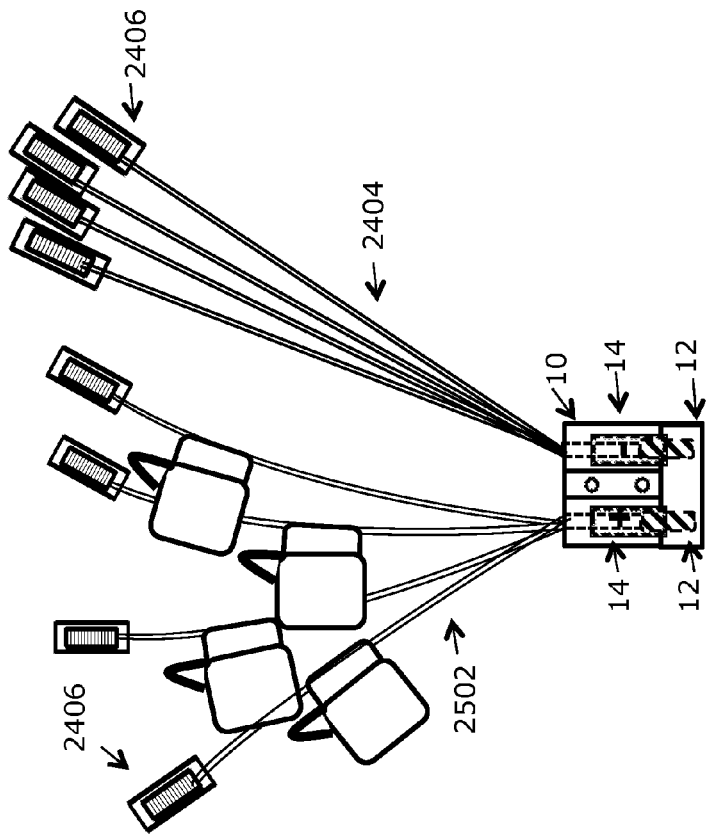
FIG. 27 illustrates a top down view of a multi-device connector according to one embodiment of the present invention.
Figure 26:
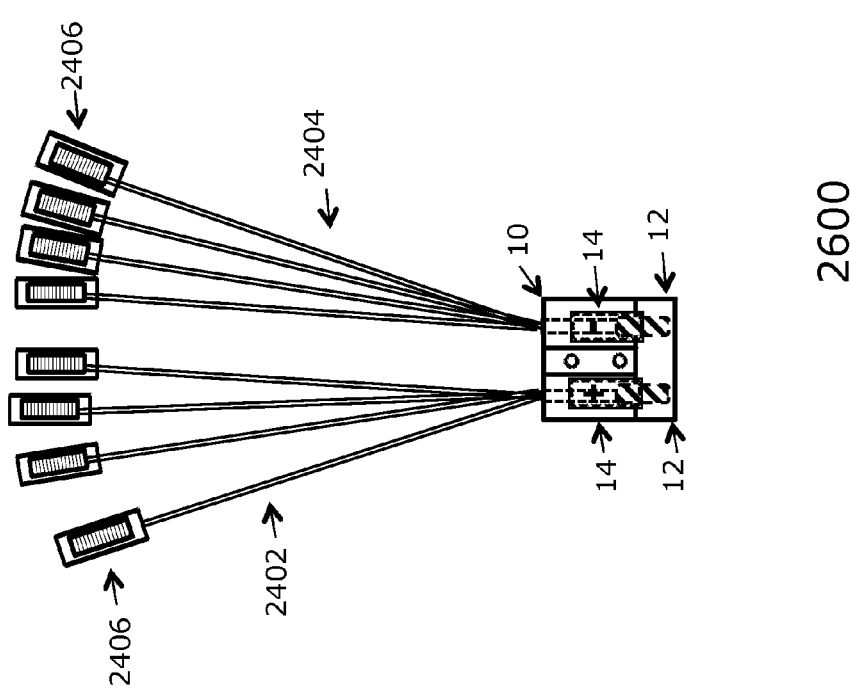
FIG. 26 illustrates a top down view of a multi-device connector according to one embodiment of the present invention.
Figure 28:
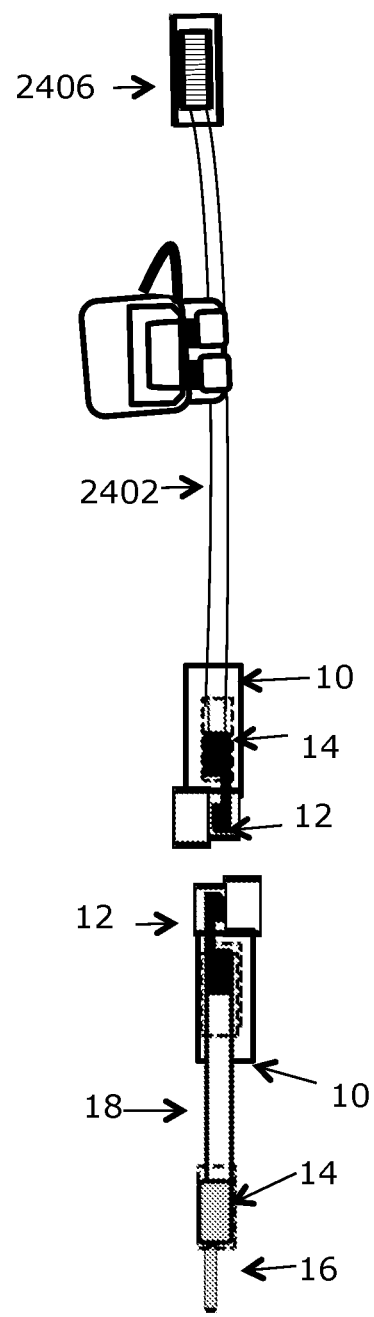
FIG. 28 illustrates a side view of a part of a multi-device connector and a mated battery side connector according to one embodiment of the present invention.

In general, the disclosed multi-device connection system 2400, 2500 can convert one battery connection into a multi-device battery system by connecting a battery 32 to multiple devices in parallel. In one embodiment, as illustrated in FIGS. 24 and 25, the disclosed multi-device connection system 2400, 2500 generally includes a multi-device connector 2600, 2700, as illustrated in FIGS. 26 and 27, and a mated battery side connector 500, as illustrated in FIG. 5 and described above. More specifically, in one embodiment, the multi-device connector 2600, 2700 includes a connection block 10, two or more red wire leads 2402, 2502, each red wire lead 2402, 2502 attached on one end to a wire terminal 2406 and on the other end, via a terminal connector 12 covered with shrink wire wrap 14, to the connection block 10, and two or more black wire leads 2404, each black wire lead 2404 attached on one end to a wire terminal 2406 and on the other end, via a terminal connector 12 covered with shrink wire wrap 14, to the connection block 10. In one embodiment, as illustrated in FIG. 27, the red wire leads 2502 are fused together and each red wire lead 2502 is attached to a fuse block. In another embodiment, each red wire lead 2402 can be attached to an inline fuse holder, illustrated in FIG. 32. In some embodiments, shrink wire wrap 14 is not used for one or more of the above-described connections.

FIG. 6 illustrates how the system enables a user to efficiently, and safely, connect and disconnect several devices from the battery 32. For example, FIG. 6 illustrates a side view of a connection block 10 for the multi-device connector 2600, 2700 and a side view of a connection block 10 for the mated battery side connector 500, and shows how the two connection blocks 10 connect to each other. More specifically, the terminal connectors 12 are designed to stack on top of each other when the connection block 10 for the multi-device connector 2600, 2700 connects to the connection block 10 for the mated battery side connector 500. FIGS. 7 and 8 further illustrate how the terminal connectors 12 and the terminal connector slots 30 line up to permit easy connection of the connection blocks 10.

In one embodiment of the multi-device connection system 2400, 2500, the red wire leads 2402, 2502 and the black wire leads 2404 are of equal length and wire gauge. In another embodiment, they are of different lengths. As described above, the red wire leads 2402, 2502 and the black wire leads 2406 can each be connected to the same connection block 10. For example, a terminal connector 12 can be crimped to the ends of each wire lead and covered with, for example, shrink wire wrap 14, therefore sealing the wire leads to the terminal connectors 12. In some embodiments, shrink wire wrap 14 is not used. The sealed combination of the red wire leads 2402, 2502 and terminal connectors 12 can then be inserted and locked into a terminal connector slot 30 on the positive terminal of the connection block 10.

Figure 29:
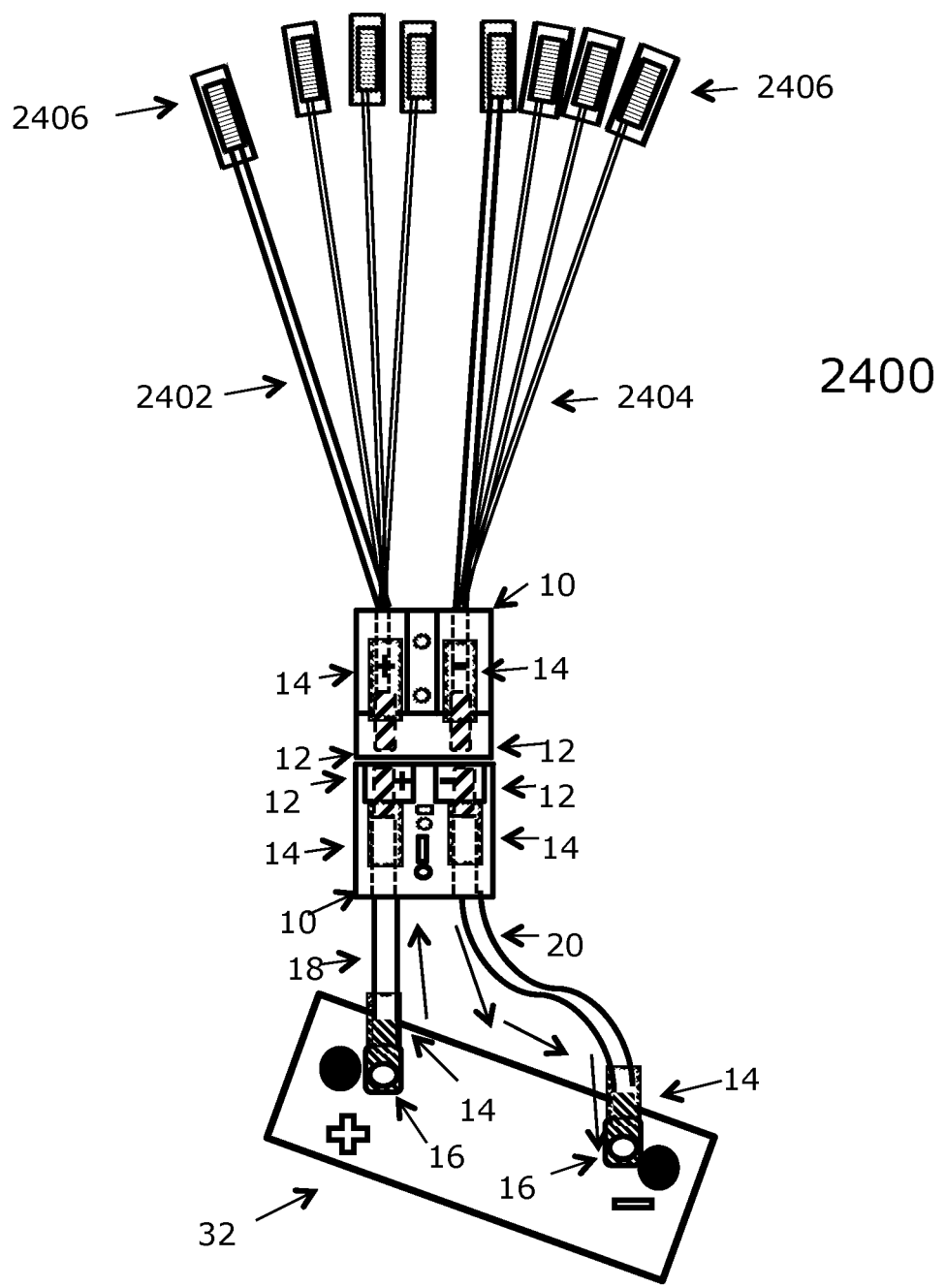
FIG. 29 illustrates a top down view of the disclosed multi-device connection system connected to a battery according to one embodiment of the present invention.
Figure 30:
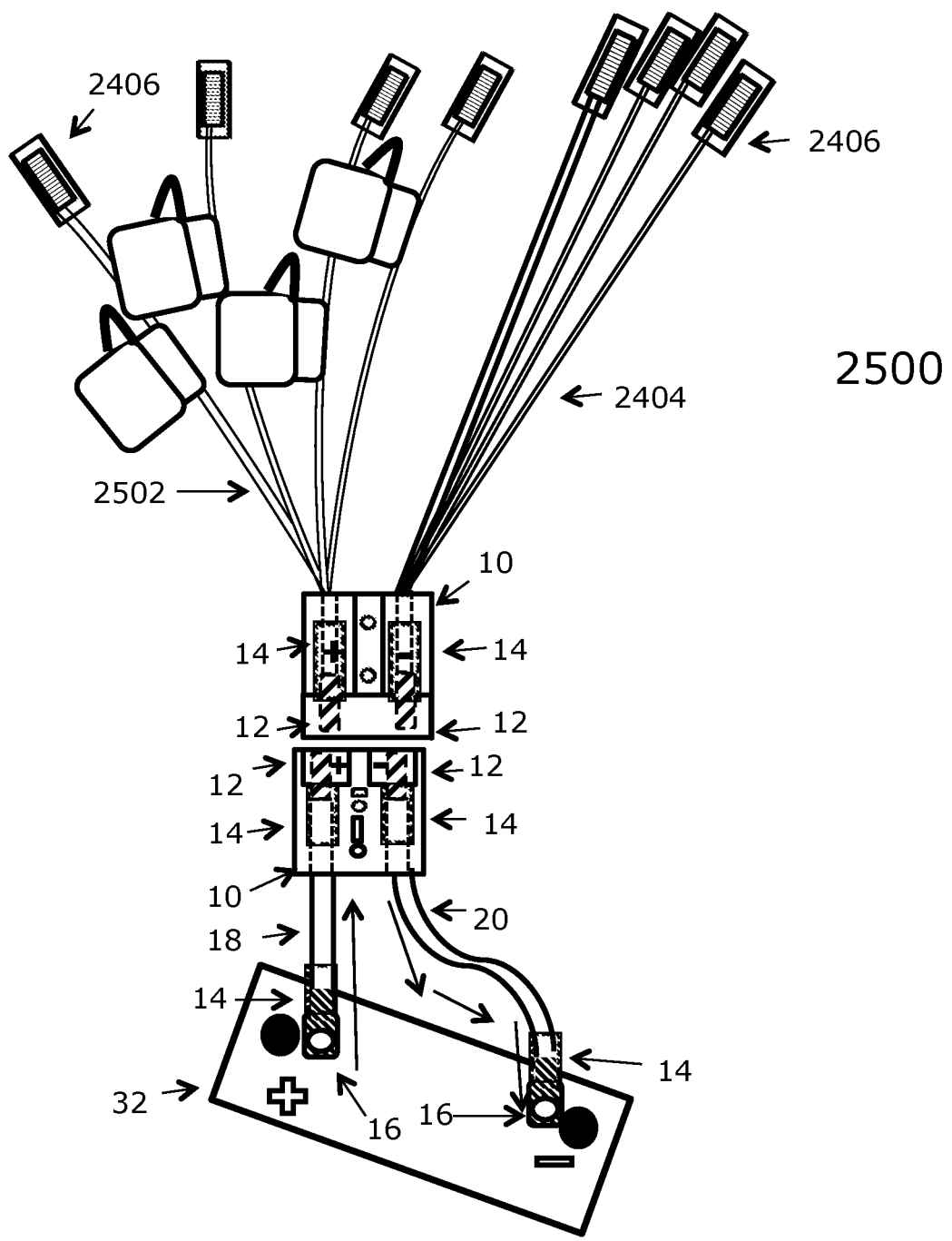
FIG. 30 illustrates a top down view of the disclosed multi-device connection system connected to a battery according to one embodiment of the present invention.

The sealed combination of the black wire leads 2404 and terminal connectors 12 can also be inserted and locked into a terminal connector slot 30 on the negative terminal of the connection block 10. The ends of each wire lead that are not connected to a connection block 10 can be connected to a wire terminal 2406, as illustrated in FIG. 24 through 30. FIGS. 24, 26, and 29 illustrate a multi-device connection system 2400 wherein the red wire leads 2402 can connect to multiple devices using non-fused wire leads. FIGS. 25, 27, and 30 illustrate a multi-device connection system 2500 wherein the red wire leads 2502 can connect to multiple devices using fused wire leads.

Therefore, the full connection setup for a multi-device connection system 2400, 2500 when connected to a battery 32 includes a mated battery side connector 500 with a first connection block 10 and connected to a battery 32 through the use of two terminal lug connectors 16, fused or non-fused red wire leads 2402, 2502 connected to devices' power cables and the positive terminal of a second connection block 10, the black wire leads 2404 connected to devices' power cables and the negative terminal of the second connection block 10, and the second connection block 10 of the multi-device connector 2600, 2700 paired and connected to the first connection block 10 of the mated battery side connector 500. Once these connections are made, the user has a fused or non-fused multi-device connection system. To disconnect the multi-device connector 2600, 2700 from the battery 32, a user can unplug the connection blocks 10 from each other.

Figure 31:
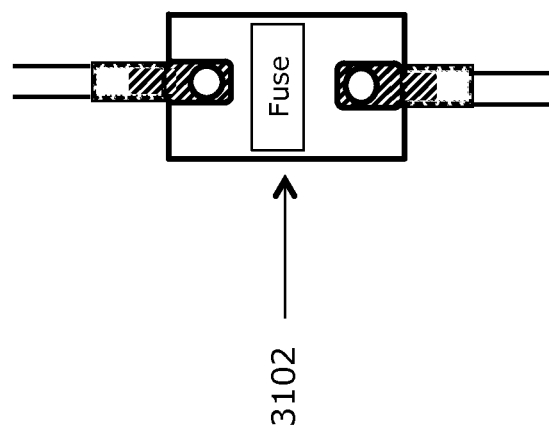
FIG. 31 illustrates an inline fuse according to one embodiment of the present invention.
Figure 32:
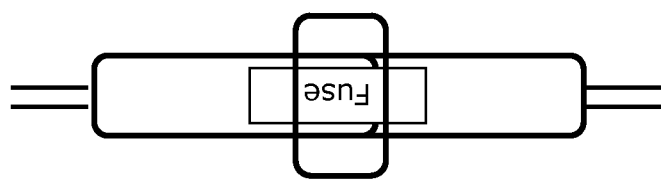
FIG. 32 illustrates an inline fuse according to one embodiment of the present invention.

In one embodiment, the disclosed multi-battery connection system is made of components using tinned marine wire, tinned copper-coated electrical terminals, 2:1 reduction wire protection shrink tape and a connection block 10. However, the various components of the multi-battery connection system 100, 200 and multi-device connection system 2400, 2500 can be made of different quality materials. Additionally, each connection systems 100, 200, 2000, 2100, 2400, 2500 can be integrated into a complete wire harness or can exist as a standalone unit, utilizing supplemental or integrated fuse protection, illustrated in FIGS. 31 and 32, to protect any attached devices. Further, the batteries 32 can maintain operation over extended periods of non-use through a battery maintainer/charger connection, which can be protected by an inline fuse as illustrated in FIG. 32.

The various embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

What is claimed is:

1. A battery connection system for connecting first and last batteries together, each battery having a positive terminal and a negative terminal, the battery connection system comprising:
   a first and a last top connection block, each having a positive terminal and a negative terminal;
   a first and a last bottom connection block, each having a positive terminal and a negative terminal;
   a red wire lead having a first end and a second end;
   a black wire lead having a first end and a second end;
   a first bridging wire having a first end and a second end;
   at least two red wires, each having a first end and a second end; and
   at least two black wires, each having a first end and a second end;
   wherein:
      the red wire lead is secured on the first end to a first connector and on the second end to a first terminal connector;
      the second end of the red wire lead is attached to the positive terminal of the first top connection block;
      the black wire lead is secured on the first end to a second connector and on the second end to a second terminal connector;
      the second end of the black wire lead is attached to the negative terminal of the last top connection block;
      the first bridging wire is secured on the first end to a third terminal connector and on the second end to a fourth terminal connector;
      the first end of the first bridging wire is attached to the negative terminal of the first top connection block;
      the second end of the first bridging wire is attached to the positive terminal of the last top connection block;
      a first red wire is secured on the first end to a fifth terminal connector and on the second end to a first terminal lug connector;
      the first end of the first red wire is attached to the positive terminal of the first bottom connection block and the second end of the first red wire is attachable to the positive terminal of a first battery;
      a first black wire is secured on the first end to a sixth terminal connector and on the second end to a second terminal lug connector;
      the first end of the first black wire is attached to the negative terminal of the first bottom connection block and the second end of the first black wire is attachable to the negative terminal of the first battery;
      a second red wire is secured on the first end to a seventh terminal connector and on the second end to a third terminal lug connector;
      the first end of the second red wire is attached to the positive terminal of the last bottom connection block and the second end of the second red wire is attachable to the positive terminal of a second battery;
      a second black wire is secured on the first end to an eighth terminal connector and on the second end to a fourth terminal lug connector;
      the first end of the second black wire is attached to the negative terminal of the last bottom connection block and the second end of the second black wire is attachable to the negative terminal of the second battery; and
      the first top connection block removably connects to the first bottom connection block and the last top connection block removably connects to the last bottom connection block.

2. The battery connection system of claim 1, wherein the battery connection system is converted into a battery connection system for connecting three or more batteries, each battery having a positive terminal and a negative terminal, the three or more battery connection system comprising:
   an additional middle top connection block for each additional battery, each additional middle top connection block having a positive terminal and a negative terminal;
   an additional middle bottom connection block for each additional battery, each additional middle bottom connection block having a positive terminal and a negative terminal;

an additional bridging wire for each additional battery, each additional bridging wire have a first end and a second end;

an additional red wire for each additional battery, each additional red wire having a first end and a second end; and an additional black wire for each additional battery, each additional black wire having a first end and a second end;

wherein, for each additional battery:

the additional bridging wire is secured on the first end to an additional, first terminal connector and on the second end to an additional, second terminal connector;

the first end of the additional bridging wire is attached to the negative terminal of the first, top connection block or the middle, top connection block;

the second end of the additional bridging wire is attached to the positive terminal of the last, top connection block or the middle, top connection block;

the additional red wire is secured on the first end to an additional, third terminal connector and on the second end to an additional, first terminal lug connector;

the first end of the additional red wire is attached to the positive terminal of the middle, bottom connection block and the additional first terminal lug connector is attachable to the positive terminal of the additional battery;

the additional black wire is secured on the first end to an additional, fourth terminal connector and on the second end to an additional, second terminal lug connector;

the first end of the additional black wire is attached to the negative terminal of the middle, bottom connection block and the additional second terminal lug connector is attachable to the negative terminal of the additional battery; and the middle, top connection block removably connects to the middle, bottom connection block.

3. The battery connection system of claim 2, further comprising a secondary connection system comprising:

a first, secondary system red wire lead secured on a first end to a first, secondary system connector and on a second end to a first, secondary system terminal connector, a first, secondary system black wire lead secured on a first end to a second, secondary system connector and on a second end to a second, secondary system terminal connector, a middle, secondary system red wire lead secured on a first end to a third, secondary system connector and on a second end to a third, secondary system terminal connector, a middle, secondary system black wire lead secured on a first end to a fourth, secondary system connector and on a second end to a fourth, secondary system terminal connector, a last, secondary system red wire lead secured on a first end to a fifth, secondary system connector and on a second end to a fifth, secondary system terminal connector, and a last, secondary system black wire lead secured on a first end to a sixth, secondary system connector and on a second end to a sixth, secondary system terminal connector.

4. The battery connection system of claim 3, wherein the second end of the first, secondary system red wire lead is attached to the positive terminal of the first, top connection block, the second end of the first, secondary system black wire lead is attached to the negative terminal of the first, top connection block, the second end of the middle, secondary system red wire lead is attached to the positive terminal of the middle, top connection block, the second end of the middle, secondary system black wire lead is attached to the negative terminal of the middle, top connection block, the second end of the last, secondary system red wire lead is attached to the positive terminal of the last, top connection block, and the second end of the last, secondary system black wire lead is attached to the negative terminal of the last, top connection block.

5. The battery connection system of claim 2, wherein the battery connection system further connects to a load by connecting the first end of the red wire lead and the first end of the black wire lead to the load.

6. The battery connection system of claim 1, further comprising a secondary connection system comprising:

a first, secondary system red wire lead secured on a first end to a first, secondary system connector and on a second end to a first, secondary system terminal connector;

a first, secondary system black wire lead secured on a first end to a second, secondary system connector and on a second end to a second, secondary system terminal connector;

a last, secondary system red wire lead secured on a first end to a third, secondary system connector and on a second end to a third, secondary system terminal connector; and a last, secondary system black wire lead secured on a first end to a third, secondary system connector and on a second end to a third, terminal connector.

7. The battery connection system of claim 6, wherein the second end of the first, secondary system red wire lead is attached to the positive terminal of the first, top connection block, the second end of the first, secondary system black wire lead is attached to the negative terminal of the first, top connection block, the second end of the second, secondary system red wire lead is attached to the positive terminal of the last, top connection block, and the second end of the second, secondary system black wire lead is attached to the negative terminal of the last, top connection block.

8. The battery connection system of claim 1, wherein the battery connection system removably connects to a load by connecting the first end of the red wire lead and the first end of the black wire lead to the load.

9. The battery connection system of claim 8, wherein the load is a motor.

10. The battery connection system of claim 9, wherein the motor is selected from the group consisting of a trolling motor, a recreational vehicle motor, an automotive motor, an industrial motor, a manufacturing motor, and combinations thereof.

11. The battery connection system of claim 8, wherein the load is selected from the group consisting of an electric winch, a boatlift, electronics, lights, appliances, and combinations thereof.

12. The battery connection system of claim 1, wherein the first and the second connectors are butt splice connectors.

13. A connection system for connecting a plurality of devices to a battery, the connection system comprising:

two connection blocks, each having a positive terminal and a negative terminal;

at least four red wire leads, each having a first end and a second end;

at least four black wire leads, each having a first end and a second end;

a red wire having a first end and a second end; and a black wire having a first end and a second end;

wherein:

each red wire lead is connected on its first end to a wire terminal and on its second end to a terminal connector;

each black wire lead is connected on its first end to a wire terminal and on its second end to a terminal connector;

the second end of each red wire lead is attached to the positive terminal of a first connection block;

the second end of each black wire lead is attached to the negative terminal of a first connection block;

the red wire is secured on the first end to a terminal connector and on the second end to a terminal lug connector;

the first end of the red wire is attached to the positive terminal of the second connection block and the second end of the red wire is attachable to the positive terminal of a battery;

the black wire is secured on the first end to a terminal connector and on the second end to a terminal lug connector;

the first end of the black wire is attached to the negative terminal of the second connection block and the second end of the black wire is attachable to the negative terminal of the battery; and the first connection block removably connects to the second connection block.

14. The connection system of claim 13, wherein the first ends of the red wire leads are fused together.

15. The connection system of claim 14, wherein each red wire lead is attached to a fuse block.

16. The connection system of claim 14, wherein each red wire lead is attached to an inline fuse holder.

\* \* \* \* \*